United States Patent [19]
Johnson

[11] Patent Number: 5,323,333
[45] Date of Patent: Jun. 21, 1994

[54] APPARATUS AND METHOD FOR ALLOCATING TOLERANCES

[76] Inventor: Richard W. Johnson, 6509 Brentfield Ct., (Dallas County) Dallas, Tex. 75248

[21] Appl. No.: 814,751

[22] Filed: Dec. 30, 1991

[51] Int. Cl.$^5$ .................................................. G01B 5/02
[52] U.S. Cl. ................................ 364/571.02; 364/570
[58] Field of Search ............ 364/570, 560, 578, 571.02

[56] References Cited

PUBLICATIONS

Evaluation of Cost-Tolerance Algorithms for Design Tolerance Analysis and Synthesis, Manufacturing Review, vol. 1, No. 3, Oct. 1988 pp. 168-179, Wu et al.
Design Issues in Mechanical Tolerance Analysis, American Society of Mechanical Engineers, 1988 (no month) pp. 50-59 by K. W. Chase et al.
Deigning for Economical Production, 2nd Ed., Society of Manufacturing Engineers, 1987 (no month) pp. 1-45 by Dr. H. E. Trucks.
"Least Cost Tolerances-I", Internat'l. Journal of Production Research, vol. 8, No. 1, Aug. 18, 1969, pp. 65-74 by Bennett et al.
Least Cost Tolerances-II, Internat'l. Journal of Production Research, vol. 8, No. 2, Aug. 18, 1969-pp. 169-181 by Bennett, et al.
Tolerancing the Components of an Assembly for Minimum Cost-the ASME Journal of Engineering for Industry, Aug. 1970, pp. 677-682 by J. Peters.
Calculation of Tolerance Based on a Minimum Cost Approach-ASME Journal of Engineering for Industry, May 1972 pp. 447-453, by F. H. Speckhart.
Allocation of Tolerances to Minimize Cost of Assembly, ASME Journal of Engineering for Industry, Aug. 1973, pp. 762-764 by M. F. Spotts.
Minimum Exponential Cost Allocation of Sure-Fit Tolerances-ASME Journal of Engineering for Industry, Nov. 1975, pp. 1395-1398, by D. Wilde.
Method for Optimal Tolerance Selection, ASME Journal of Engineering for Industry, Aug. 1977, pp. 558-565, by P. F. Ostwalt et al.
Assessment and optimization of dimensional tolerances, Computer-Aided Design, vol. 17, No. 4, May 1985, pp. 191-199 by Parkinson, D. B.

Automatic Optimal Tolerance Design for Related Dimension Chains-Dong et al. Dec. 1990-vol. 3, No. 4.
Computer Aided Tolerance Assignment-Raman et al. 1991 (no month)-vol. 21, Nos. 1-4 pp. 67-71.
The Strategic Design Driven Inspection of Machined Parts Galm et al. pp. 122-128-1988 (no month).
Incorporating Knowledge of Geometric Dimensioning and Tolerancing into a Feature-Based CAD System-Jacobsohn et al. pp. 152-159-1990 (no month).
Schjaer-Jacobsen, Hans, et al., *Algorithms for Worst-Case Tolerance Optimization*, IEEE Transactions on Circuits and Systems, vol. CAS-26, No. 9, Sep. 1979, pp. 775-783.
Roy, U., et al., *Review of Dimensioning and Tolerancing: Representation and Processing*, Computer-Aided Design, 23(1991) Sep., No., London, GB, pp. 466-483.
Chase, K. W., et al., *Least Cost Tolerance Allocation for Mechanical Assemblies With Automated Process Selection*, Manufacturing Review, vol. 3, No. 1, Mar. 1990, pp. 49-59.

*Primary Examiner*—Jack B. Harvey
*Assistant Examiner*—Thomas Peeso
*Attorney, Agent, or Firm*—Robert L. Troike; Richard L. Donaldson

[57] ABSTRACT

A method and apparatus are provided for allocating tolerances. A total tolerance is specified (218) to be allocated among a plurality of variable tolerances each having an associated assembly feature. For each associated assembly feature, an associated first tolerance point is defined (202) at which a further decrease in a stringency of the variable tolerance fails to significantly decrease a cost of achieving the variable tolerance. For each associated assembly feature, an associated second tolerance point is defined (202) at which a further increase in the stringency begins to substantially increase the cost of achieving the variable tolerance. For each associated assembly feature, an associated third tolerance point is defined (202) at which a further increase in the stringency is not substantially achievable. The total tolerance is allocated (226, 232, 254, 266, 236, 242, 258, 270, 246) among the variable tolerances, such that the variable tolerances substantially satisfy a first predetermined relationship relative to the total tolerance, and such that each variable tolerance substantially satisfies a second predetermined relationship relative to its associated tolerance points.

23 Claims, 8 Drawing Sheets

ALL TOLERANCES ARE EQUAL

TOLERANCES ARE UNEQUAL

APPARATUS AND METHOD FOR ALLOCATING TOLERANCES

TECHNICAL FIELD OF THE INVENTION

This invention relates in general to manufacturing processes and in particular to a method and apparatus for allocating tolerances.

BACKGROUND OF THE INVENTION

Assembly stackups of mechanical parts result in overall assembly lengths, clearance gaps, overlaps, and interferences. One or more of these assembly phenomena occurs in every mechanical design. In a typical manufacturing process, fabrication tolerances are assigned to part features which are involved in assembly stackups. Proper tolerancing of part features is important to achieve desired functional requirements that relate to physical variation. Tolerances establish the limits of variability in the size, location, and form of part features, and these limits should be maintained during manufacturing of a part feature.

The assignment of mechanical fabrication tolerances is a function of (1) the type of part feature, such as turned diameter, milled length, cast boss length, and injection-molded slot width, (2) manufacturing process capability for the type of part feature, (3) assembly stackup geometry and (4) allowable overall assembly stackup tolerance. Manufacturability considers the increased cost of manufacturing a part feature with more stringent tolerance. Consequently, the process of assigning tolerances for part features simultaneously relates to both the functionality and the manufacturability of designs.

Typical tolerancing approaches require a time-consuming iterative process of tolerance analysis, which is used to "home in" on tolerances that satisfy functional requirements. This iterative process of tolerance analysis involves (1) estimating appropriate tolerances for part features involved in an assembly stackup, based upon an engineer's subjective intuition and experience, and (2) analyzing the assembly stackup using a tolerance analysis model to determine if the estimated tolerances produce an undesired fit condition. If an undesired fit condition is produced, then the estimated tolerances are iteratively adjusted in an attempt to eliminate the undesired fit condition, and the tolerance analysis process is repeated until an appropriate assignment of tolerances is achieved.

Such iterative tolerancing approaches are subjective, relying upon a particular engineer's experience and training over a broad range of manufacturing processes. Consequently, the results of iterative tolerancing approaches vary significantly from one engineer to another, and an appropriate assignment of tolerances is uncertain even if an engineer has many years of experience. Moreover, iterative tolerancing approaches are very time-consuming. Thus, appropriate tolerances might not be achieved if development time is limited, resulting in undesired fit conditions and costly changes during production.

Also, a tolerance model is usually selected for part features in an assembly stackup. Available tolerance models include (1) worst case, (2) root sum squared ("RSS"), and (3) modified RSS ("MRSS"). Statistical tolerance models are less stringent and therefore less costly than worst case tolerance models, because statistical tolerance models recognize the probability that not all part feature dimensions of an assembly stackup will extend to their maximum limits of variability at the same time. Despite the availability of significant cost savings afforded by statistical tolerance models, worst case tolerances are nevertheless assigned to many non-critical parts, because previous approaches to determining statistical tolerances are iterative, time-consuming and uncertain. By assigning worst case tolerances to such non-critical parts, manufacturing costs are unnecessarily inflated because tolerances are overly stringent.

It is therefore desirable to simultaneously determine worst case and statistical tolerances in a non-iterative manner, in order to facilitate an informed selection between worst case, RSS, or MRSS tolerance models. It is also desirable to achieve a desired functional fit and manufacturability for the part features involved, without having to iteratively adjust estimated tolerances to repeat a tolerance analysis process. Such a non-iterative approach is typically referred to as "tolerance allocation". Tolerance allocation uses manufacturability (cost versus tolerance) data which quantify the increase in manufacturing cost necessary to achieve a more stringent tolerance.

Although the need for tolerance allocation has been previously identified, earlier approaches to tolerance allocation have proved impractical, because they commonly require full-range manufacturability data curves for a wide range of manufacturers, fabrication processes, and part features. Such full-range manufacturability data curves are difficult to obtain, and a large-scale expensive effort would be required to compile information necessary to create such full-range manufacturability data curves.

Thus, a need has arisen for a method and apparatus for allocating tolerances, in which tolerances are allocated in a non-iterative and standardized manner. Moreover, it is desired to provide a method and apparatus for allocating tolerances, in which functionality and manufacturability of a mechanical design are simultaneously considered, and in which worst case and statistical tolerances are simultaneously determined. Finally, a need has arisen for a method and apparatus for allocating tolerances which is based upon easily obtainable manufacturability data, and in which tolerance analysis is not required to verify functionality after tolerances are assigned.

SUMMARY OF THE INVENTION

In a method and apparatus for allocating tolerances, a total tolerance is specified to be allocated among a plurality of variable tolerances each having an associated assembly feature. For each associated assembly feature, an associated first tolerance point is defined at which a further decrease in a stringency of the variable tolerance fails to significantly decrease a cost of achieving the variable tolerance. For each associated assembly feature, an associated second tolerance point is defined at which a further increase in the stringency begins to substantially increase the cost of achieving the variable tolerance. For each associated assembly feature, an associated third tolerance point is defined at which a further increase in the stringency is not substantially achievable. The total tolerance is allocated among the variable tolerances, such that the variable tolerances substantially satisfy a first predetermined relationship relative to the total tolerance, and such that each variable tolerance substantially satisfies a second predetermined relationship relative to its associated tolerance points.

It is a technical advantage of the present invention that tolerances are allocated in a non-iterative manner.

It is another technical advantage of the present invention that tolerances are allocated in a standardized manner.

It is a further technical advantage of the present invention that functionality and manufacturability of a design are simultaneously considered.

It is yet another technical advantage of the present invention that worst case and statistical tolerances are simultaneously determined.

In still another technical advantage of the present invention, a method and apparatus for allocating tolerances is provided which is based upon easily obtainable manufacturability data.

In a further technical advantage of the present invention, tolerance analysis is not required to verify functionality after tolerances are assigned.

For a more complete understanding of the present invention, and the advantages thereof, reference is now made to the following description, taken in conjunction with the accompanying drawings, in which:

FIG. 1 is a cross-sectional view of an exemplary assembly stack tolerances are allocated;

FIGS. 2a-b are graphs of tolerance model curves;

FIGS. 3a-b are graphs of manufacturability data relating manufacturing costs to manufacturing criteria, according to the preferred embodiment;

FIG. 4 is a graph of manufacturability data relating manufacturing costs to tolerance values, according to the preferred embodiment;

FIGS. 5a-g are flow charts of an approach to allocating tolerances, according to the preferred embodiment;

DETAILED DESCRIPTION OF THE PREFERRED EMBODIMENT

The preferred embodiment of the present invention and its advantages are best understood by referring to FIGS. 1 through 8 of the drawings, like numerals being used for like and corresponding parts of the various drawings.

An appropriate tolerance is normally determined for each mechanical part feature in an assembly stackup. Proper tolerancing of a part feature involves several considerations, including part size, part material, fabrication method and its associated cost, thermal conditions, assembly function and its impact on total allocatable tolerance throughout the assembly stackup, and the part feature's interrelationship with other tolerances in the assembly stackup.

For example, stringent tolerances are easier to achieve on small part features than on larger part features. Hard steel typically is more expensive to machine than softer materials. Similarly, each fabrication method has a different associated cost, such that part features requiring stringent tolerances typically are fabricated using more expensive methods than part features requiring less stringent tolerances. More lenient tolerances are usually assigned to part features that are especially likely to expand or shrink in size after fabrication. Total allocatable tolerance throughout the assembly stackup should be appropriately determined so that the assembly stackup functions in accordance with its designed purpose. Since the assembly stackup may include several part features each having different characteristics, proper tolerancing of any part feature should consider the part feature's interrelationship with other tolerances in the assembly stackup.

Figure 1:
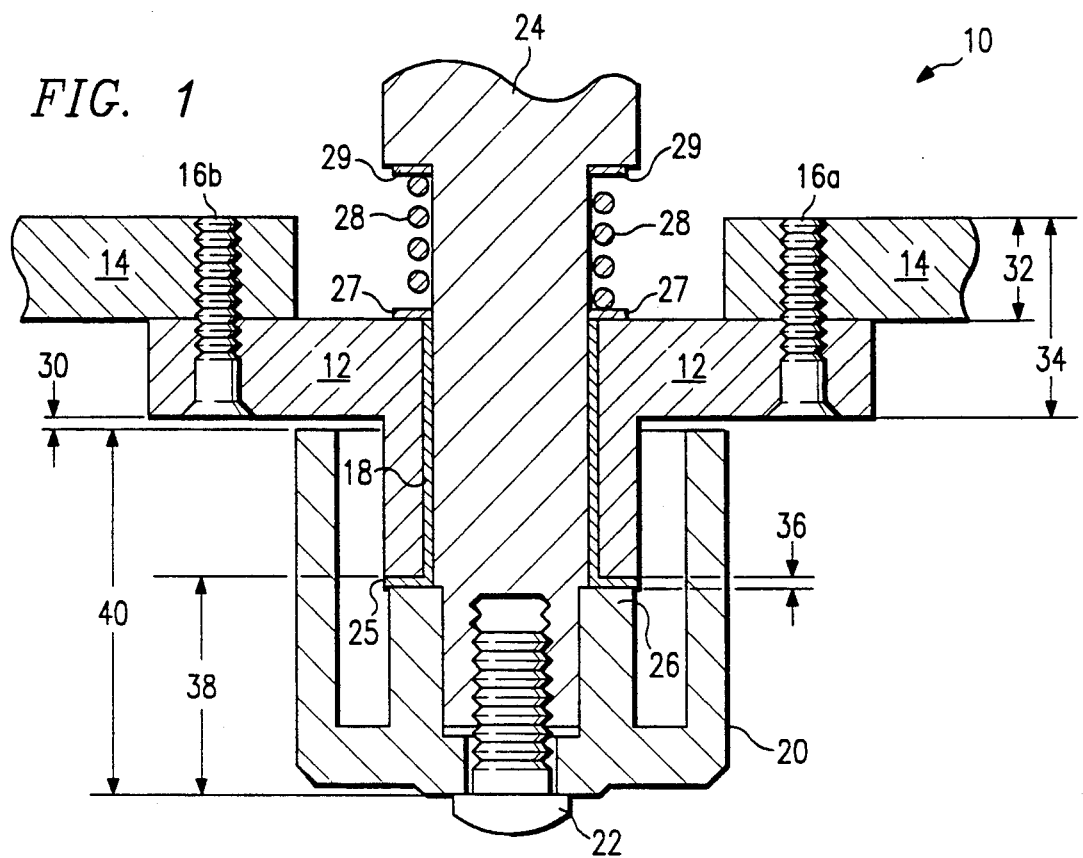

FIG. 1 is a cross-sectional view of an exemplary assembly stackup, indicated generally at 10, for which tolerances are allocated. Assembly stackup 10 includes a base 12, which is connected to a panel 14 by screws 16a and 16b. Base 12 has a cylindrical chamber whose interior wall is fully covered by wear bushing 18. A knob 20 is connected by a screw 22 to a cylindrical shaft 24, which is rotationally mounted against wear bushing 18 within the cylindrical chamber of base 12. A wear bushing 25 covers a first outer lip of the cylindrical chamber of base 12 and is interposed between base 12 and a shoulder 26 of knob 20. A wear washer 27 covers a second outer lip of the cylindrical chamber of base 12 and is interposed between base 12 and a spring 28. A wear bushing 29 covers a ledge area of cylindrical shaft 24 and is interposed between cylindrical shaft 24 and spring 28. Spring 28 pushes against wear washer 27 and against wear bushing 29, such that shoulder 26 of knob 20 is pulled against wear bushing 25.

In FIG. 1, the functional design of assembly stackup 10 includes an assembly gap 30 to avoid a direct interference between base 12 and knob 20. A width of assembly gap 30 is determined by the following feature dimensions: (1) a first turned external length 32 of base 12, (2) a second turned external length 34 of base 12, (3) a thickness 36 of wear bushing 25, (4) a turned internal length 38 of knob 20, and (5) a turned external length 40 of knob 20. The identification of feature dimensions which collectively determine a width of assembly gap 30 is referred to as constructing a dimension loop. Table 1 shows exemplary feature dimensions of assembly gap 30, first turned external length 32, second turned external length 34, thickness 36, turned internal length 38, and turned external length 40. All dimensions and tolerances are shown in units of inches.

TABLE 1

| MECHANICAL TOLERANCE ALLOCATION TABLE | | | | |
| --- | --- | --- | --- | --- |
| TOTAL TOLERANCE | | 0.300 | | |
| FIXED TOLERANCE | | −0.001 | | |
| ALLOCATABLE TOLERANCE | | =0.029 | $C_f = 1.41$ | |
| TOLERANCE TYPE | FEATURE DIMENSION | WORST CASE TOLER. | RSS TOLER. | MRSS TOLER. |
| FIXED: | | | | |
| THICKNESS (36) | 0.060 | 0.001 | 0.001 | 0.001 |
| ALLOCATABLE: | | | | |

TABLE 1-continued

| MECHANICAL TOLERANCE ALLOCATION TABLE | | | | |
|---|---|---|---|---|
| TURNED EXT LENGTH (32) | −0.500 | 0.005 | 0.011 | 0.008 |
| TURNED EXT LENGTH (34) | 1.350 | 0.008 | 0.016 | 0.011 |
| TURNED INT LENGTH (38) | 1.125 | 0.007 | 0.014 | 0.010 |
| TURNED EXT LENGTH (40) | −2.000 | 0.009 | 0.018 | 0.013 |
| TOTALS | 0.035 NOMINAL GAP (30) | 0.030 | 0.060 | 0.043 |

TABLE 1 illustrates the process of constructing a dimension loop equation for assembly stackup 10 by showing the feature dimensions of turned external length 32 and turned external length 40 as being substracted from the feature dimensions of thickness 36, turned external length 34, and turned internal length 38, in order to properly compute the width of assembly gap 30. After properly constructing such a dimension loop for an assembly stackup, such as assembly stackup 10, tolerances are assigned to different feature dimensions as shown in Table 1.

In FIG. 1, the width of assembly gap 30 is the relevant functional design requirement for assembly stackup 10, so that a direct interference is avoided between base 12 and knob 20. In order to achieve this desired functional design requirement, Table 1 establishes a worst case tolerance at assembly gap 30 of 0.030 inches, so that a minimum width of assembly gap 30 is 0.035−0.030=0.005 inches, and so that a maximum width of assembly gap 30 is 0.035+0.030=0.065 inches. Consequently, the total sum of worst case tolerances for the feature dimensions of thickness 36, turned external length 32, turned external length 34, turned internal length 38, and turned external length 40 should not exceed 0.030 inches, because the total sum of these worst case tolerances determines the worst case tolerance of assembly gap 30. An approach is presented herein for allocating a total allocatable tolerance to variable feature dimensions of a dimension loop, as shown in FIG. 1 and in Table 1, in order to achieve a relevant functional design requirement.

In the preferred embodiment, all tolerances are represented in an equal bilateral plus and minus (+/−) format, rather than in a total format. For example, in the total format, a dimension of assembly gap 30 might be represented as 0.005+0.060−0 inches (nominal size=0.005 inches, tolerance=+0.060−0 inches). In an equal bilateral plus and minus (+/−) format, the same dimension of assembly gap 30 is specified as 0.035+0.030−0.030 or 0.035±0.030.

Sometimes, a feature dimension has a fixed tolerance, as for example when the feature dimension is independently established by a third-party manufacturer. Table 1 illustrates such a fixed tolerance for thickness 36 of wear bushing 25. Thus, thickness 36 of wear bushing 25 is 0.060±0.001 inches. The approach of the preferred embodiment accounts for such fixed tolerances by adjusting the total worst case tolerance. Table 1 shows such an adjustment, whereby the total worst case tolerance of 0.030 inches of assembly gap 30 is decremented by the fixed tolerance of wear bushing 25 to calculate a total allocatable tolerance of 0.029 inches. The total allocatable tolerance of 0.029 inches is then appropriately allocated to the variable feature dimensions of turned external length 32, turned external length 34, turned internal length 38, and turned external length 40.

Table 1 shows such an allocation, in which turned external length 32 is allocated a worst case tolerance of ±0.005 inches, turned external length 34 is allocated a worst case tolerance of +0.008 inches, turned internal length 38 is allocated a worst case tolerance of ±0.007 inches, and turned external length 40 is allocated a worst case tolerance of ±0.009 inches. The total sum of these worst case tolerances, together with the fixed tolerance (±0.001 inches) of thickness 36 of wear bushing 25, does not exceed the worst case tolerance at assembly gap 30 of ±0.030 inches.

Table 1 also shows statistical tolerance allocations, according to root sum squared ("RSS") and modified RSS ("MRSS") statistical tolerance models. The RSS and MRSS statistical tolerance models use a Gaussian distribution curve to determine a probable distribution of tolerances, realizing the probability that not all part feature dimensions of an assembly stackup will extend to their maximum limits of variability at the same time. By manufacturing part features with tolerances determined according to a normal Gaussian distribution curve, any particular assembly stackup of such manufactured part features has a theoretical 99.73% likelihood of satisfying a specified total worst case tolerance of the assembly stackup. Statistical tolerance models are most useful for assembly stackups involving at least approximately five manufactured part features.

The RSS statistical model uses a central limit theorem, such that the root sum square of all individual feature dimension tolerances in Table 1 is equal to the specified worst case tolerance at assembly gap 30 of ±0.030 inches. Thus,

| $0.001^2$ | (squared RSS tol. of thickness 36) |
|---|---|
| $+0.011^2$ | (squared RSS tol. of turned ext. length 32) |
| $+0.016^2$ | (squared RSS tol. of turned ext. length 34) |
| $+0.024^2$ | (squared RSS tol. of turned int. length 38) |
| $+0.018^2$ | (squared RSS tol. of turned ext. length 40) |
| $=0.030^2$ | (squared RSS estimated 99.73% probable worst case tol. at assembly gap 30) | even though 0.001+0.011+0.016+0.014+0.018=0.060 (100% guaranteed worst case sum of all RSS tolerances).

If the feature dimensions of assembly stackup 10 are manufactured according to the RSS tolerances shown in Table 1, then assembly stackup 10 has a theoretical 99.73% likelihood of satisfying the specified worst case tolerance at assembly gap 30 of ±0.030 inches. However, assembly stackup 10 also has a theoretical 0.27% likelihood of exceeding the specified worst case tolerance at assembly gap 30, possibly extending up to 0.060 inches (100% guaranteed worst case sum of all RSS tolerances) if all part feature dimensions of assembly stackup 10 extend to their maximum limits of variability at the same time. Sometimes, cost is minimized by simply discarding those parts within a manufactured lot that have unacceptably high variations, rather than by imposing more stringent tolerances on all parts within the manufactured lot.

According to the MRSS statistical model, the root sum square of all individual feature dimension tolerances in Table 1, when multiplied by a correction factor ($C_f$), is equal to the specified worst case tolerance at assembly gap 30 of $\pm 0.030$ inches. $C_f$ is a calculated real number, typically between 1.4 and 1.7, depending upon a particular assembly stackup. In Table 1, $C_f$ is equal to 1.41. Thus,

| | |
|---|---|
| $0.001^2$ | (squared MRSS tol. of thickness 36) |
| $+0.008^2$ | (squared MRSS tol. of turned ext. length 32) |
| $+0.011^2$ | (squared MRSS tol. of turned ext. length 34) |
| $+0.010^2$ | (squared MRSS tol. of turned int. length 38) |
| $+0.013^2$ | (squared MRSS tol. of turned ext. length 40) |
| $=0.021^2$ | (squared RSS of all MRSS tolerances) |
| $\times 1.41^2$ | (squared $C_f$) |
| $=0.030^2$ | (squared MRSS estimated 99.73% probable worst case tol. at assembly gap 30) | even though $0.001+0.008+0.011+0.010+0.013=0.043$ (100% guaranteed worst case sum of all MRSS tolerances). The MRSS tolerances are more stringent than the theoretical RSS tolerances, in order to account for the possibility that a setup error or poorly controlled process might shift the mean of the part feature's size distribution away from the specified nominal dimension in actual manufacturing.

For example, under the RSS analysis in Table 1, turned internal length 38 has a theoretical feature dimension of $1.125 \pm 0.014$. However, in actual manufacturing, a setup error might shift the mean of the feature size distribution of turned internal length 38 from 1.125 to 1.121. By using a calculated correction factor ($C_f$), the MRSS statistical model accounts for mean shifts in part feature size distributions.

If the feature dimensions of assembly stackup 10 are manufactured according to the MRSS tolerances shown in Table 1, then assembly stackup 10 has a theoretical 99.73% likelihood of satisfying the specified worst case tolerance at assembly gap 30 of $\pm 0.030$ inches, even considering the possibility that setup errors might shift part feature size distributions in actual manufacturing. However, assembly stackup 10 also has a theoretical 0.27% likelihood of exceeding the specified worst case tolerance at assembly gap 30, possibly extending up to 0.043 inches (100% guaranteed worst case sum of all MRSS tolerances) if all part feature dimensions of assembly stackup 10 extend to their maximum limits of variability at the same time. Sometimes, the calculated MRSS tolerances might be more stringent than worst case tolerances, and worst case tolerances should normally be used in such situations instead of MRSS tolerances.

Figure 2A:
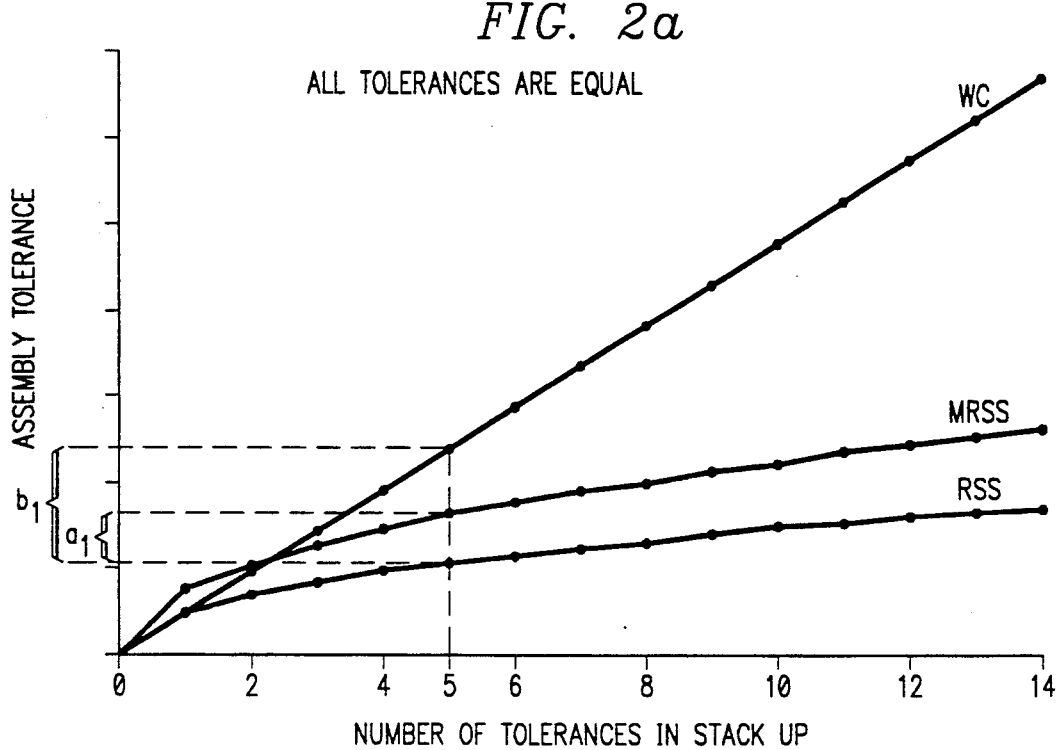
Figure 2B:
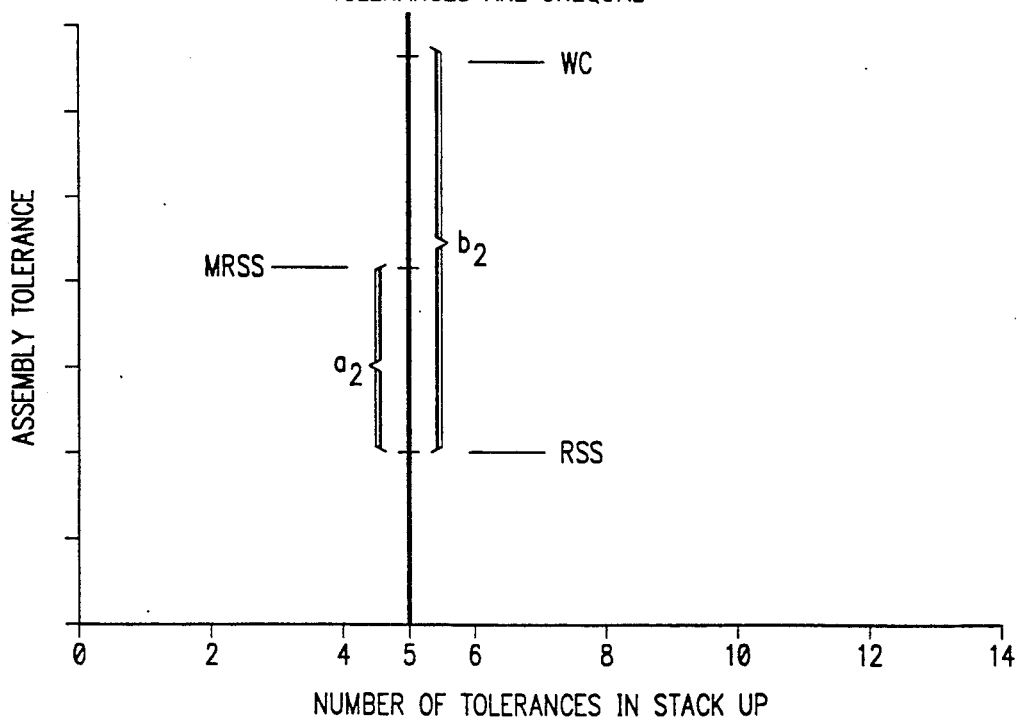

FIGS. 2a-b are graphs of tolerance model curves used to calculate a correction factor ($C_f$) for the MRSS statistical model. Given a set of tolerances for part features in an assembly stackup where each part feature's tolerance is equal to any other part feature's tolerance, FIG. 2a shows the relationship between the worst case sum of all such tolerances ("WC"), the root sum square of all such tolerances ("RSS"), and the modified root sum square for all such tolerances ("MRSS") using a mid-range correction factor ($C_f=1.5$). Since all tolerances are equal, $WC = N \times T$, where N is the number of part features in the assembly stackup, and where T is each part feature's tolerance. Also, since all tolerances are equal, $$RSS = \sqrt{\sum_{i=1}^{N} T^2} = \sqrt{N \times T^2} = T\sqrt{N} = \frac{NT}{\sqrt{N}} = \frac{WC}{\sqrt{N}}$$

Using a mid-range $C_f=1.5$, then $MRSS = 1.5 \times RSS$ by definition. Thus, if $a_1$ is defined as $$(MRSS - RSS) = (1.5 \times RSS) - RSS = 0.5 \times RSS,$$

and if $b_1$ is defined as $(WC - RSS)$, then $$\frac{a_1}{b_1} = \frac{0.5 \times RSS}{WC - RSS} = \frac{0.5 \times WC/\sqrt{N}}{WC - WC/\sqrt{N}} = \frac{0.5 \times WC}{WC\sqrt{N} - WC} =$$

$$\frac{0.5}{\sqrt{N} - 1}$$

Given a set of tolerances for part features in an assembly stackup where each part feature's tolerance may be different from any other part feature's tolerance, FIG. 2b shows the relationship between WC, RSS, and MRSS for all such tolerances. In FIG. 2b, the relationship between RSS, MRSS and WC is not the same as in FIG. 2a, because each part feature's tolerance may be different from any other part feature's tolerance. Thus, $$\sqrt{\sum_{i=1}^{N} T_i^2} \neq T\sqrt{N} \neq \frac{WC}{\sqrt{N}}$$

In order to maintain the same relationship between RSS, MRSS, and WC in FIG. 2b as in FIG. 2a, a correction factor ($C_f$) is calculated for FIG. 2b, based upon the ration $a_1/b_1$ of FIG. 2a being equal to a ratio $a_2/b_2$ of FIG. 2b. Therefore, in FIG. 2b, if $a_2$ is defined as $(MRSS - RSS)$, and if $b_2$ is defined as $(WC - RSS)$, then $$MRSS = RSS + a_2 = RSS + \frac{a_1}{b_1} \times b_2 = RSS +$$

$$\frac{0.5}{\sqrt{N} - 1} \times b_2 = RSS + \frac{0.5 \times (WC - RSS)}{\sqrt{N} - 1}$$

$$= RSS \times \left[ 1 + \frac{0.5 \times (WC - RSS)}{RSS \times (\sqrt{N} - 1)} \right] =$$

$$RSS \times Cf$$

such that $Cf = 1 + \frac{0.5 \times (WC - RSS)}{RSS \times (\sqrt{N} - 1)}$

This relationship is demonstrated in Table 1. According to the MRSS statistical model, the root sum square of all individual feature dimension tolerances in Table 1, when multiplied by a correction factor ($C_f$), is equal to the specified worst case tolerance at assembly gap 30 of ±0.030 inches. In Table 1, $C_f$ is equal to 1.41. Thus,

| | |
|---|---|
| $0.001^2$ | (squared MRSS tol. of thickness 36) |
| $+0.008^2$ | (squared MRSS tol. of turned ext. length 32) |
| $+0.011^2$ | (squared MRSS tol. of turned ext. length 34) |
| $+0.010^2$ | (squared MRSS tol. of turned int. length 38) |
| $+0.013^2$ | (squared MRSS tol. of turned ext. length 40) |
| $=0.021^2$ | (squared RSS of all MRSS tolerances) |
| $\times 1.41^2$ | (squared $C_f$) |
| $=0.030^2$ | (squared MRSS estimated 99.73% probable worst case tol. at assembly gap 30) | even though $0.001+0.008+0.011+0.010+0.013=0.043$ (100% guaranteed worst case sum of all MRSS tolerances). Consequently, WC=0.043, MRSS=0.030, and RSS=0.021. These numbers verify the relationship derived above for computing $C_f$, since $$C_f = 1 + \frac{0.5 \times (WC - RSS)}{RSS \times (\sqrt{N} - 1)} =$$

$$1 + \frac{0.5 \times (0.043 - 0.021)}{0.021 \times (\sqrt{5} - 1)} \approx 1.41$$

Figure 3A:
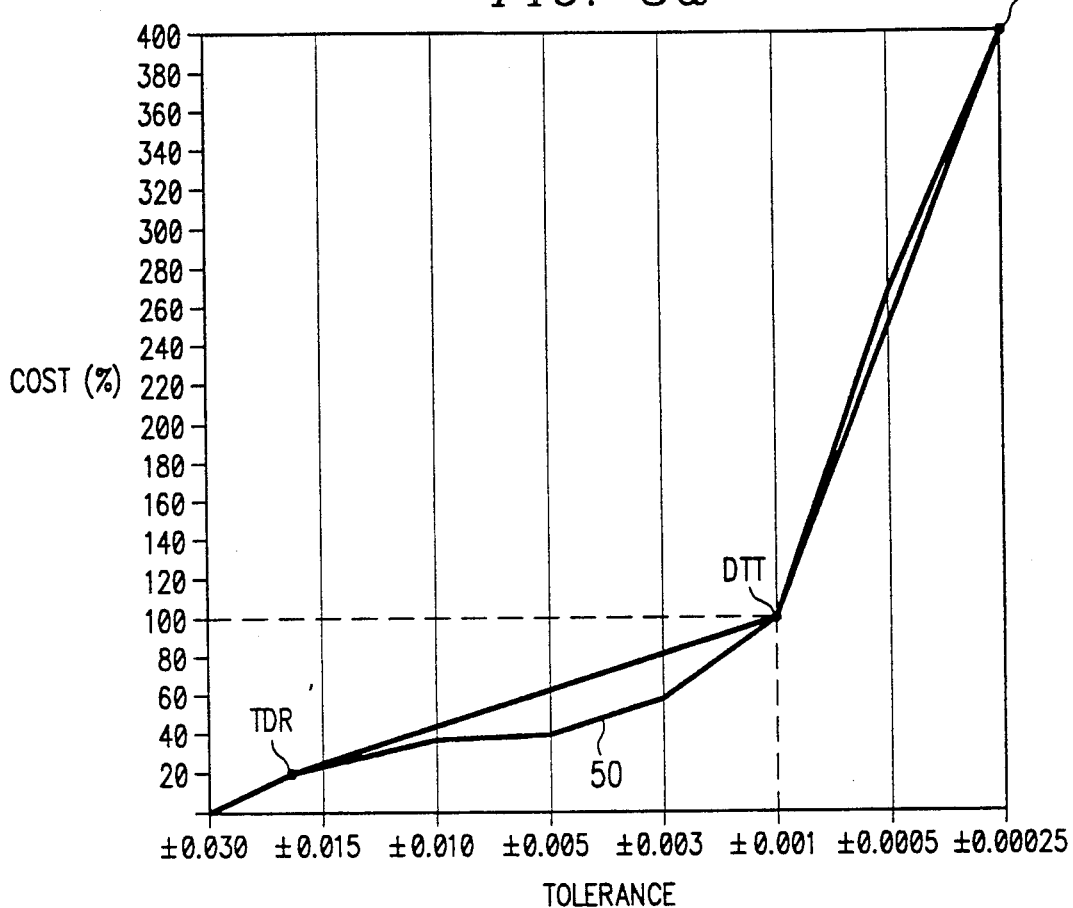
Figure 3B:
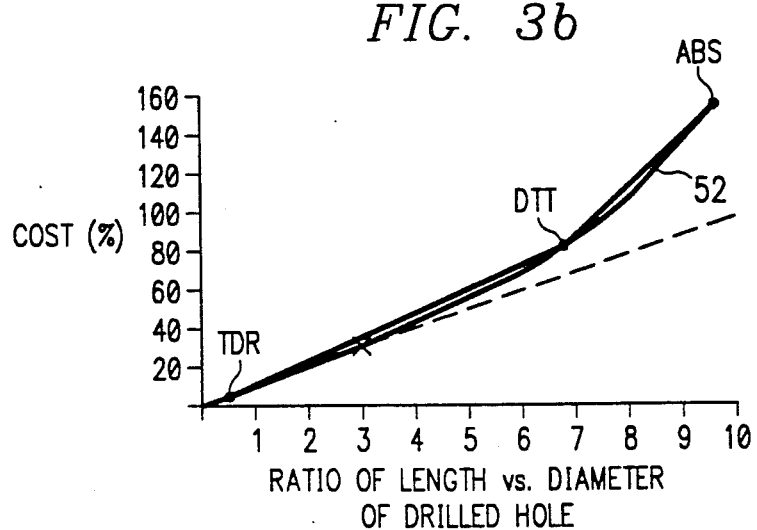

FIGS. 3a-b are graphs of manufacturability data relating manufacturing costs to manufacturing criteria, according to the preferred embodiment. Full-range manufacturability data curve 50 of FIG. 3a shows how a percentage cost of manufacturing a steel part feature increases to achieve more stringent tolerances. The x-axis of FIG. 3a is plotted on a logarithmic scale. Full-range manufacturabilty data curve 52 of FIG. 3b shows how a percentage cost of manufacturing a drilled hole increases to achieve higher ratios of length versus diameter. Significantly, full-range manufacturability data curves, such as data curves 50 and 52, are difficult to obtain, and a large-scale expensive effort would be required to compile information necessary to create full-range range manufacturability data curves for a wide range of manufacturers, fabrication processes, and part features.

Importantly, the approach of the preferred embodiment does not require full-range manufacturability data curves, such as data curves 50 and 52, in order to perform allocation. In the preferred embodiment, only three manufacturability data points are used to establish a manufacturability model. These three manufacturability data points are well-defined as (1) tolerance of diminishing returns ("TDR") where manufacturing cost fails to significantly decrease in response to a further decrease in tolerance stringency, (2) difficulty threshold tolerance ("DTT") where the manufacturing cost begins to substantially increase in response to a further increase in tolerance stringency, and 3) absolute tolerance ("ABS") where conventional manufacturing processes are technologically unable to economically produce part features with a further increase in tolerance stringency.

Since only three data points are used to characterize a part feature's manufacturability, a person having ordinary skill in the relevant art can easily obtain values for TDR, DTT and ABS in accordance with the definitions of TDR, DTT and ABS given above. Moreover, by using only three data points to characterize a part feature's manufacturability, an automated hardware system can easily maintain a computerized database of manufacturability data, as described further hereinbelow.

The TDR, DTT and ABS data points are noted in FIG. 3a, and they form two linear segments which closely approximate the full-range manufacturability curve 50 required by typical previous approaches. Similarly, the TDR, DTT and ABS data points are noted in FIG. 3b to illustrate how the approach of the preferred embodiment can be applied to other manufacturing criteria in addition to tolerances. Once again, in FIG. 3b, the TDR, DTT and ABS data points form two linear segments which closely approximate the full-range manufacturability curve 52 required by typical previous approaches.

Figure 4:
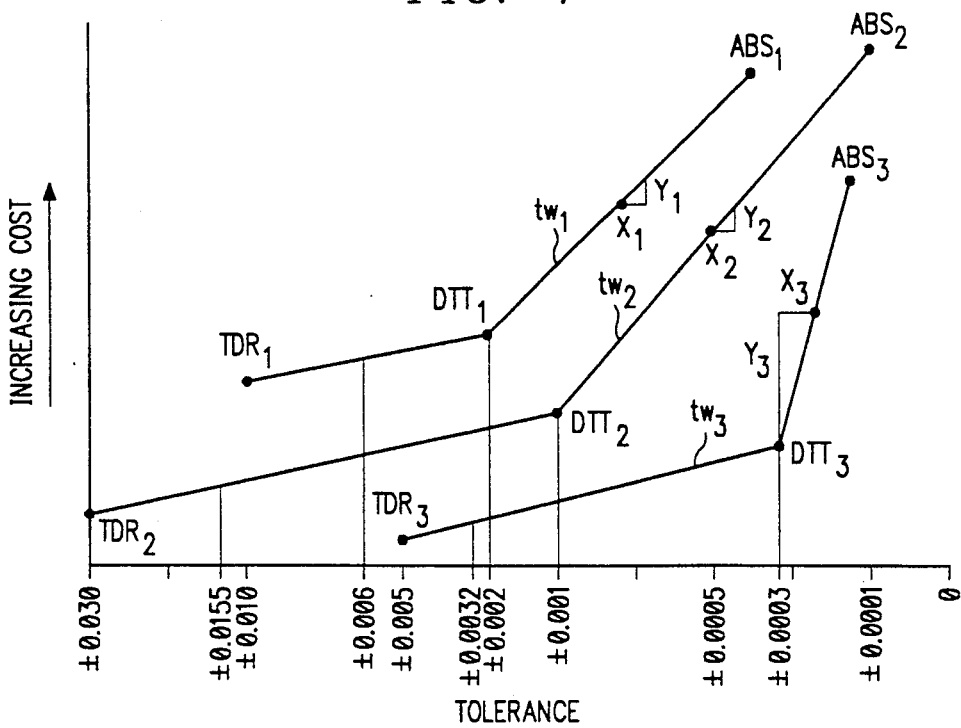

FIG. 4 is a graph of TDR, DTT and ABS manufacturability data points for three different part features. The x-axis of FIG. 4 is plotted on a logarithmic scale. Importantly, the approach of the preferred embodiment uses easily obtainable manufacturability data to allocate a total assembly tolerance to different part features involved in an assembly stackup. Each of the three part features of FIG. 4 has its own cost versus tolerance manufacturability model. These three manufacturability models are indicated generally by $t_{w1}$, $t_{w2}$, and $t_{w3}$, as formed by linear segments through the $TDR_i$, $DTT_i$, and $ABS_i$ data points, where (i=1, 2, or 3). According to each part feature's own manufacturability model, tolerances are allocated to any combination of part features in an assembly stackup, so that each part feature's allocated tolerance is equally as manufacturable as any other part feature's allocated tolerance.

For example, in FIG. 4, a cost versus tolerance manufacturability model of a first part feature ($P_1$) is indicated by $TDR_1$, $DTT_1$, and $ABS_1$. A cost versus tolerance manufacturability model of a second part feature ($P_2$) is indicated by $TDR_2$, $DTT_2$, and $ABS_2$. A cost versus tolerance manufacturability model of a third part feature ($P_3$) is indicated by $TDR_3$, $DTT_3$, and $ABS_3$.

If no fixed tolerances exist, then a total worst case tolerance ($T_{wc}$) of ±0.0033 inches is achieved by setting $P_1$'s worst case tolerance ($t_{w1}$) at $DTT_1$=±0.002, $P_2$'s worst case tolerance ($t_{w2}$) at $DTT_2$=±0.001, and $P_3$'s worst case tolerance ($t_{w3}$) at $DTT_3$=±0.0003. Thus, each part feature's allocated tolerance is equally as manufacturable as any other part feature's allocated tolerance, according to each part feature's own manufacturability model.

In a second example, if no fixed tolerances exist, then $T_{wc}$=±0.0247 inches is achieved by setting $t_{w1}$=±0.0050, $t_{w2}$=±0.0155, and $t_{w3}$=±0.0032, such that $$t_{wi} = DTT_i + P_w(TDR_i - DTT_i)$$

where (i=1, 2, or 3), and where $P_w$ is a worst case tolerance proportionality constant for all $t_{wi}$. In this second example, $P_w$=0.5. Thus, each part feature's allocated tolerance is equally as manufacturable as any other part feature's allocated tolerance, according to each part feature's own manufacturability model.

If fixed tolerances exist, then $$T_{wc} = \sum_{i=1}^{N} t_{wi} + \sum_{i=1}^{n} t_{fi}.$$

-continued such that $\sum_{i=1}^{N} t_{wi} = T_{wc} - \sum_{i=1}^{n} t_{fi}$ where N is a number of variable tolerances, and where n is a number of fixed tolerances ($t_{fi}$).

In the preferred embodiment, if $$\sum_{i=1}^{N} TDR_i > \sum_{i=1}^{N} t_{wi} > \sum_{i=1}^{N} DTT_i$$

then $P_w$ is given by $$P_w = \frac{\sum_{i=1}^{N} t_{wi} - \sum_{i=1}^{N} DTT_i}{\sum_{i=1}^{N} (TDR_i - DTT_i)}$$

Similarly, if $$\sum_{i=1}^{N} DTT_i > \sum_{i=1}^{N} t_{wi} > \sum_{i=1}^{N} ABS_i$$

then $P_w$ is given by $$P_w = \frac{\sum_{i=1}^{N} t_{wi} - \sum_{i=1}^{N} ABS_i}{\sum_{i=1}^{N} (DTT_i - ABS_i)}$$

such that $t_{wi} = ABS_i + P_w(DTT_i - ABS_i)$, where $P_w$ is a worst case tolerance proportionality constant for all $t_{wi}$. Thus, each part feature's allocated tolerance is equally as manufacturable as any other part feature's allocated tolerance, according to each part feature's own manufacturability model.

Table 2 lists typical values of TDR, DTT, and ABS for several types of part features. Table 2 is not exhaustive, but instead is merely illustrative of typical values which may vary according to different manufacturers.

TABLE 2

PART FEATURE CATALOG

| No. | Description | TDR | DTT | ABS |
|---|---|---|---|---|
| | Turned Features: | | | |
| 1. | Turned Feature Size | .010 | .005 | .0002 |
| 2. | Turned Feature Location | .010 | .004 | .0006 |
| 3. | Turned External Length | .010 | .003 | .0010 |
| | Machined Holes: | | | |
| 4. | Machined Hole Size | .010 | .003 | .0002 |
| 5. | Machined Hole Location | .010 | .003 | .0005 |
| 6. | Threaded Hole Location | .010 | .005 | .0030 |
| | Machined Lengths, Planes, and Depths: | | | |
| 7. | Machined Internal Length/Width | .010 | .005 | .0010 |
| 8. | Machined External Length/Width | .010 | .005 | .0010 |
| 9. | Machined Depth | .010 | .005 | .0020 |
| | Sheet Metal Features: | | | |
| 10. | Sheet Metal Hole Size | .010 | .006 | .0030 |
| 11. | Sheet Metal Hole Location | .015 | .010 | .0050 |
| 12. | Sheet Metal Int/Ext Length | .030 | .015 | .0050 |
| 13. | Sht Met Int/Ext Length,1 Bend | .040 | .020 | .0100 |
| 14. | Sht Met Int/Ext Length,2 Bends | .050 | .025 | .0150 |
| | Sand Casting Features: | | | |
| 15. | Sand Casting Wall Thickness | .040 | .030 | .0300 |
| 16. | Sand Casting Fillet Radius | .040 | .030 | .0300 |
| 17. | Sand Casting Int/Ext Length | .040 | .030 | .0300 |
| 18. | Sand Casting Boss/Hole Size | .040 | .030 | .0300 |
| 19. | Sand Casting Boss/Hole Location | .040 | .030 | .0300 |
| | Investment Casting Features: | | | |
| 20. | Invest Casting Wall Thickness | .030 | .020 | .0100 |

TABLE 2-continued

PART FEATURE CATALOG

| No. | Description | TDR | DTT | ABS |
|---|---|---|---|---|
| 21. | Invest Casting Fillet Radius | .030 | .020 | .0100 |
| 22. | Invest Casting Int/Ext Length | .030 | .020 | .0100 |
| 23. | Invest Casting Boss/Hole Size | .030 | .020 | .0100 |
| 24. | Invest Cast Boss/Hole Location | .030 | .020 | .0100 |
| | Die Casting Features: | | | |
| 25. | Die Casting Wall Thickness | .010 | .005 | .0040 |
| 26. | Die Casting Fillet Radius | .010 | .005 | .0040 |
| 27. | Die Casting Int/Ext Length | .010 | .005 | .0040 |
| 28. | Die Casting Boss/Hole Size | .010 | .005 | .0040 |
| 29. | Die Casting Boss/Hole Location | .010 | .005 | .0040 |
| | Injection Molded Plastic Features: | | | |
| 30. | Injection Molded Wall Thickness | .016 | .008 | .0030 |
| 31. | Injection Molded Fillet Radius | .032 | .024 | .0080 |
| 32. | Injection Mold Int/Ext Length | .020 | .015 | .0030 |
| 33. | Injection Mold Boss/Hole Size | .020 | .015 | .0030 |
| 34. | Inject Mold Boss/Hole Location | .010 | .005 | .0020 |

In Table 2, all tolerances are shown in an equal bilateral plus and minus (+/-) format, rather than in a total format. These tolerances represent general manufacturing practices. The machined part feature size tolerances are based on a size of 1.00 inch and a material type of aluminum. Part feature location tolerance is not based on any specific length, but instead applies to all distances up to 18.00 inches Sheet metal tolerances are based on a material type of aluminum and a thickness of 0.060 inches. The wall thickness and fillet radius part feature descriptions are based on a size of 0.188 inches rather than 1.00 inch. Injection molded plastic part feature tolerances are based on glass filled material types.

Figure 5A:
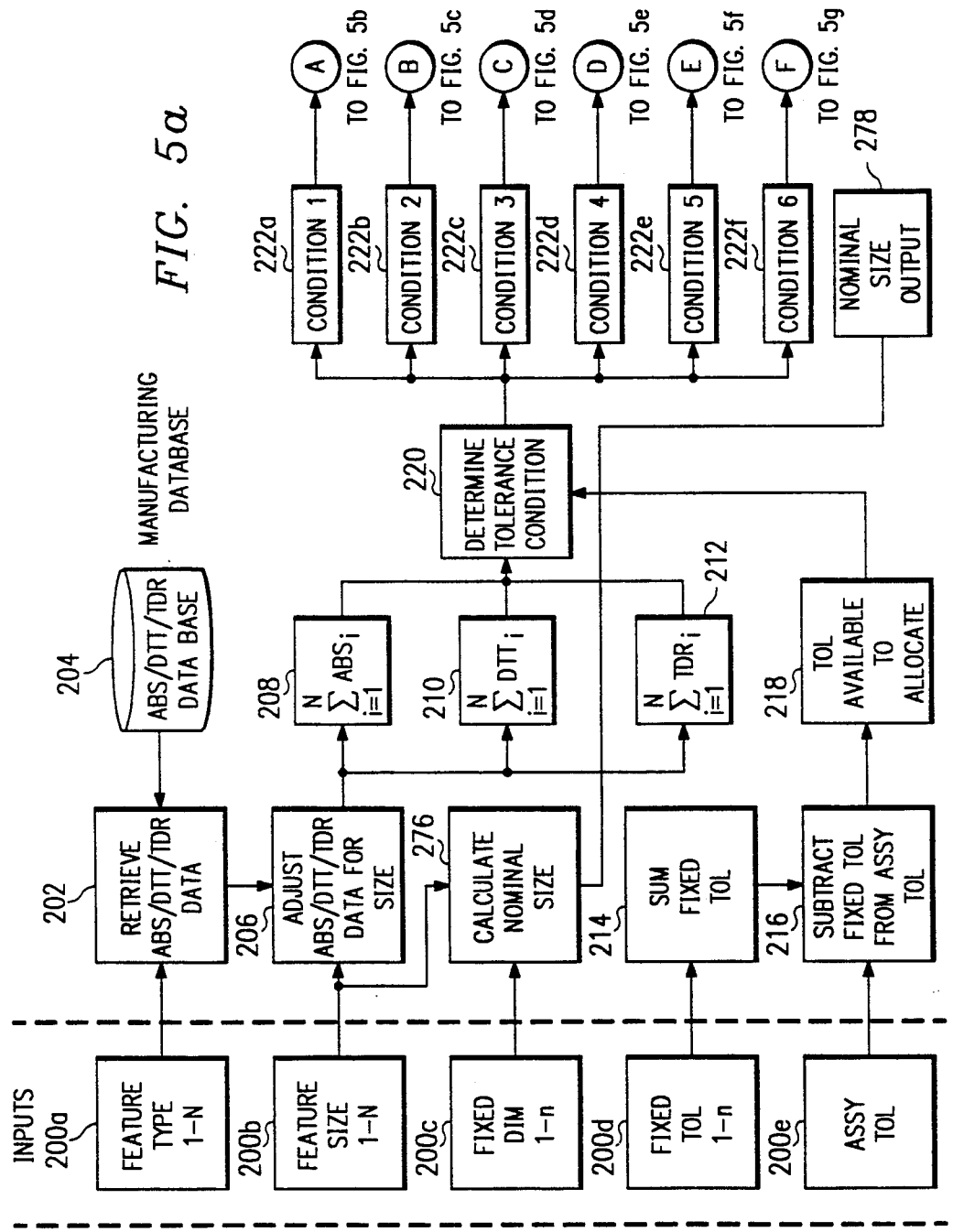
Figure 5B:
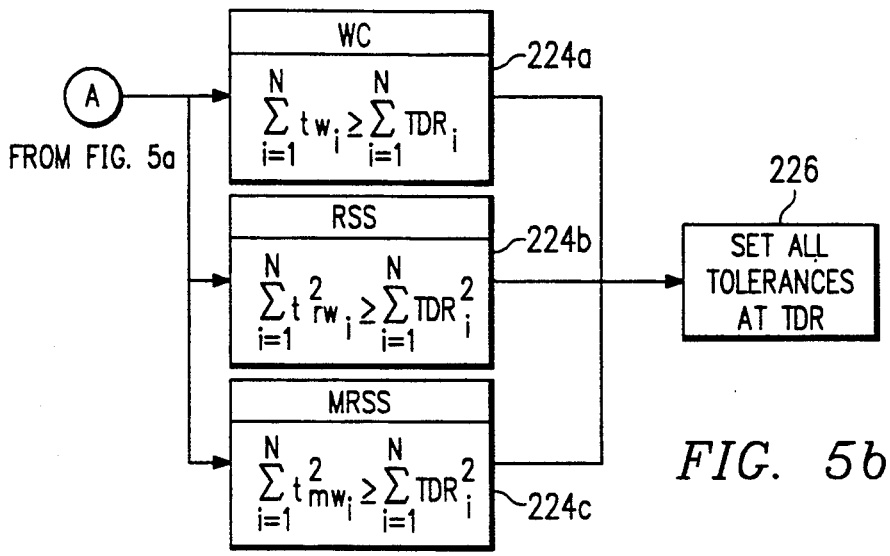
Figure 5C:
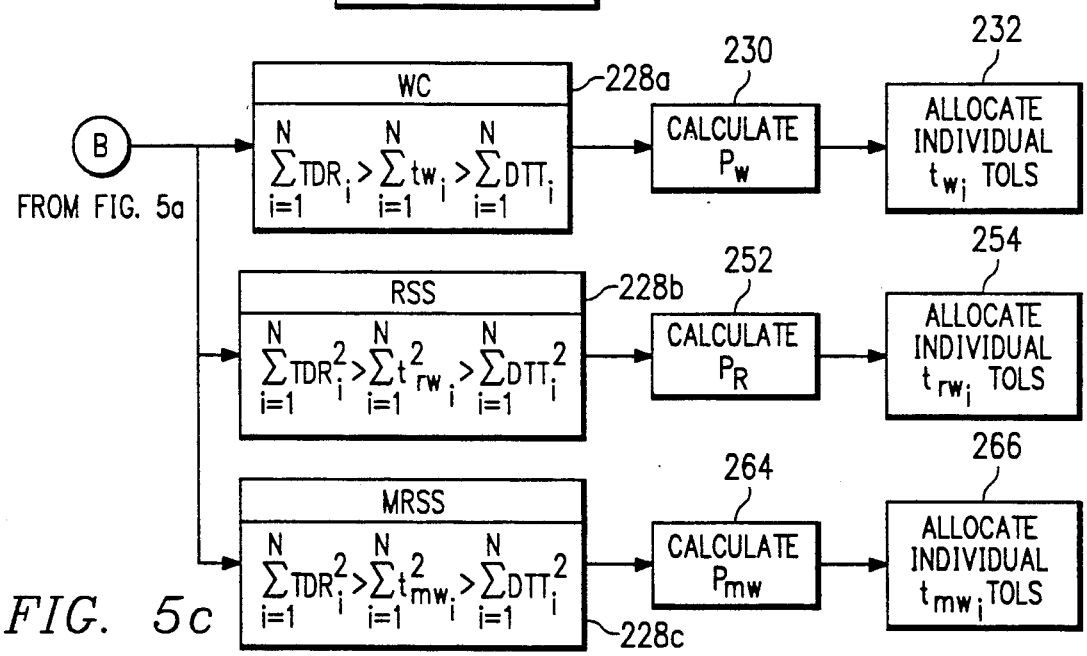
Figure 5D:
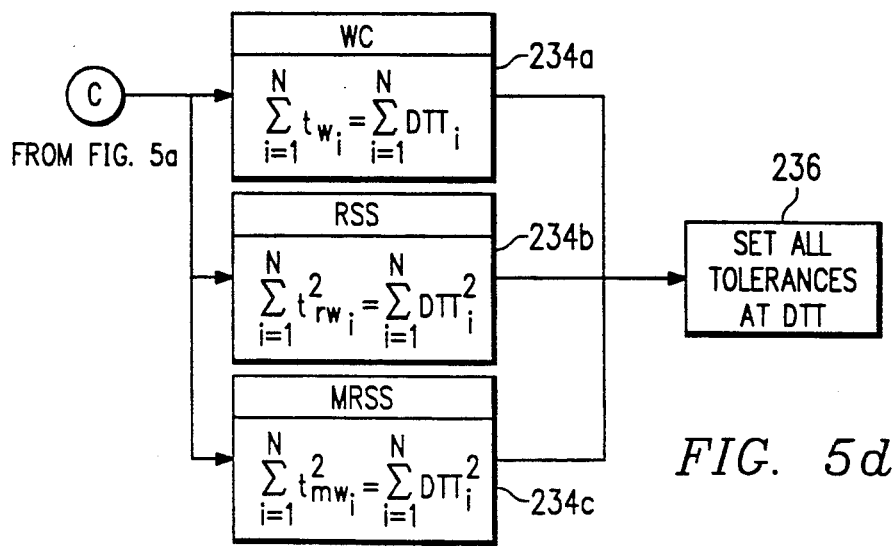
Figure 5E:
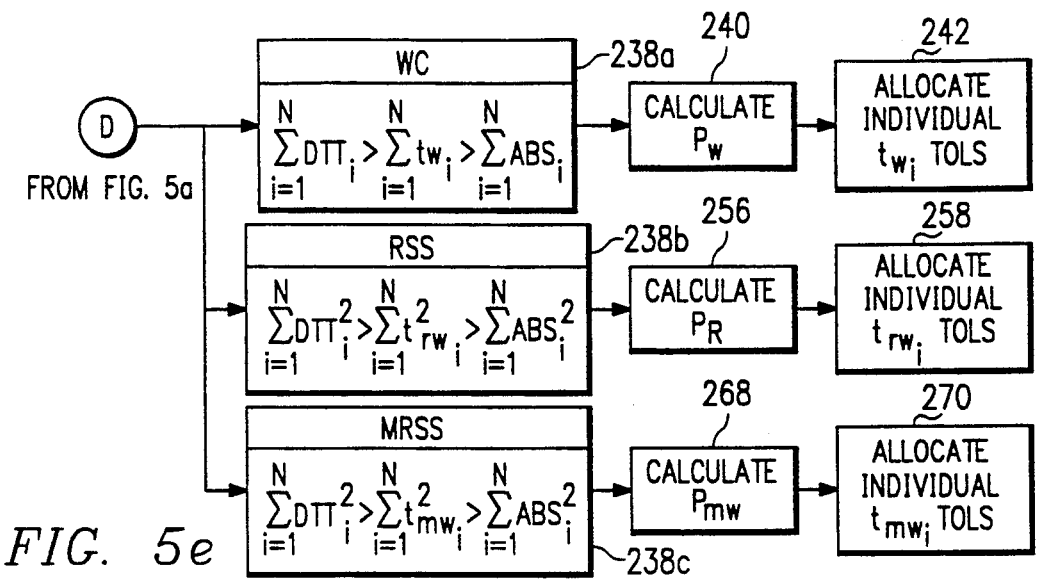
Figure 5F:
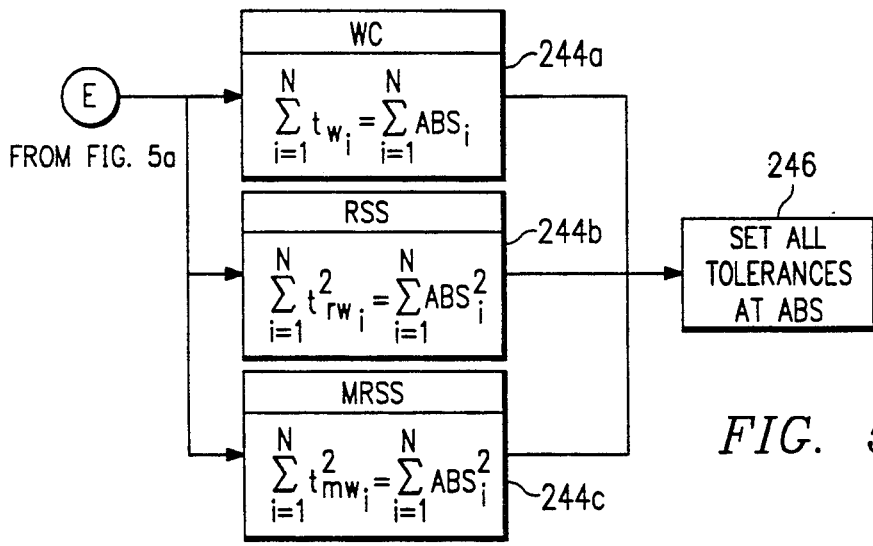
Figure 5G:
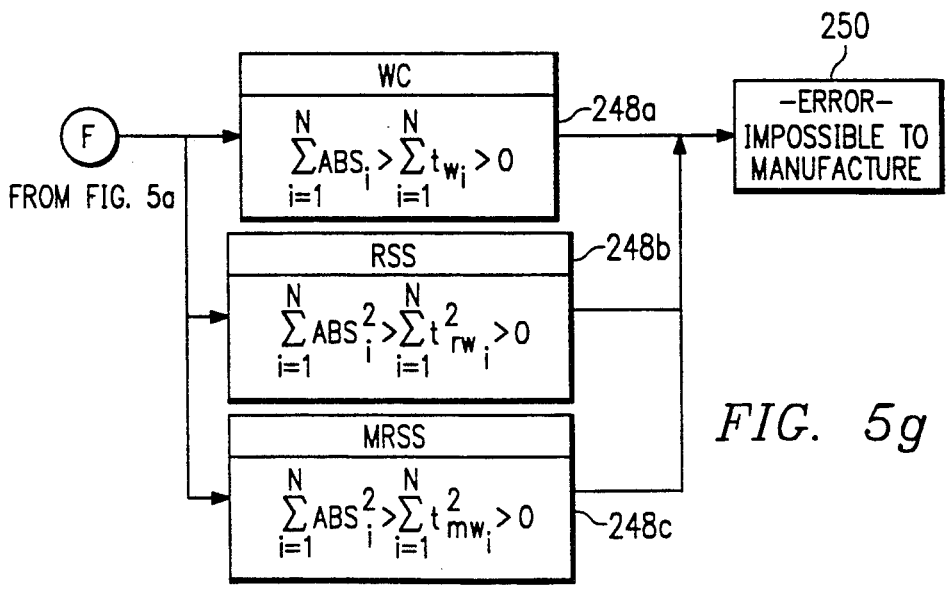

FIGS. 5a–g are flow charts of an approach to allocating tolerances, according to the preferred embodiment. In FIG. 5a, step 200a inputs the types of part features involved in an assembly stackup, where N is the number of different part features. Step 200b inputs the nominal size of each part feature having a variable tolerance. Step 200c inputs the nominal size of each part feature having a fixed tolerance, and step 200d inputs the fixed tolerance values ($t_{fi}$). Step 200e inputs the total worst case tolerance ($T_{wc}$) allowable at the assembly stackup's relevant functional dimension, such as assembly gap 30 of FIG. 1.

Step 202 retrieves unit values of the $ABS_i$, $DTT_i$, and $TDR_i$ data from a database 204 for each part feature specified at step 200a. Step 206 scales the unit values of $ABS_i$, $DTT_i$, and $TDR_i$ to account for different nominal sizes of part features specified at step 200b, so that $ABS_i$, $DTT_i$, and $TDR_i$ are increased for part features larger than one inch and decreased for part features smaller than one inch. Typically, for a machined part feature, the unit values of $ABS_i$, $DTT_i$, and $TDR_i$ are each multiplied by the cube root of the machined part feature's size in inches.

Step 208 sums all $ABS_i$ values after they are scaled to account for different nominal sizes of part features. Step 210 sums all $DTT_i$ values after they are scaled to account for different nominal sizes of part features. Step 212 sums all $TDR_i$ values after they are scaled to account for different nominal sizes of part features.

In parallel with steps 202–212, step 214 sums all fixed tolerances ($t_{fi}$) specified at step 200d, and step 216 subtracts the summed fixed tolerances ($t_{fi}$) from the total worst case tolerance ($T_{wc}$) specified at step 200e to determine a total allocatable worst case tolerance ($T_{awc}$). $T_{awc}$ is then provided to output field 218.

Step 220 inputs (1) $T_{awc}$ from output field 218, (2) the summed $ABS_i$ values from step 208, (3) the summed $DTT_i$ values from step 210, and (4) the summed $TDR_i$ values from step 212. Then, steps 222a-f respectively determine which of six possible conditions are satisfied by $T_{awc}$, based upon a comparison of $T_{awc}$ against the summed $ABS_i$ values, the summed $DTT_i$ values, and the summed $TDR_i$ values. It is possible for $T_{awc}$ to satisfy one of the six conditions under a worst case tolerance model, and to yet satisfy a different one of the six conditions under a statistical model.

Under a worst case tolerance model, $$T_{wc} = \sum_{i=1}^{N} t_{wi} + \sum_{i=1}^{n} t_{fi},$$

such that $T_{awc} = \sum_{i=1}^{N} t_{wi} = T_{wc} - \sum_{i=1}^{n} t_{fi}$ where $t_{wi}$ is an individual worst case tolerance value of a specified part feature dimension. For such a worst case tolerance model, step 224a determines whether $T_{awc}$ is greater than or equal to the summed $TDR_i$ values. If yes, then Condition 1 is satisfied, and step 226 sets each worst case tolerance value $t_{wi}$ to its associated $TDR_i$.

Under the worst case tolerance model, step 228a determines whether $$\sum_{i=1}^{N} TDR_i > \sum_{i=1}^{N} t_{wi} > \sum_{i=1}^{N} DTT_i,$$

If yes, then Condition 2 is satisfied, and step 230 calculates $P_w$ according to $$P_w = \frac{\sum_{i=1}^{N} t_{wi} - \sum_{i=1}^{N} DTT_i}{\sum_{i=1}^{N} (TDR_i - DTT_i)}$$

Then, step 232 sets each worst case tolerance value $t_{wi}$ to $$t_{wi} = DTT_i + P_w(TDR_i - DTT_i)$$

Similarly, step 234a determines whether $T_{awc}$ is equal to the summed $DTT_i$ values. If yes, then Condition 3 is satisfied, and step 236 sets each worst case tolerance value $t_{wi}$ to its associated $DTT_i$.

Step 238a determines whether $$\sum_{i=1}^{N} DTT_i > \sum_{i=1}^{N} t_{wi} > \sum_{i=1}^{N} ABS_i$$

If yes, then Condition 4 is satisfied, and step 240 calculates $P_w$ according to $$P_w = \frac{\sum_{i=1}^{N} t_{wi} - \sum_{i=1}^{N} ABS_i}{\sum_{i=1}^{N} (DTT_i - ABS_i)}$$

Then, step 242 sets each worst case tolerance value $t_{wi}$ to $$t_{wi} = ABS_i + P_w(DTT_i - ABS_i)$$

Step 244a determines whether $T_{awc}$ is equal to the summed $ABS_i$ values. If yes, the Condition 5 is satisfied, and step 246 sets each worst case tolerance value $t_{wi}$ to its associated $ABS_i$.

Step 248a determines whether $T_{awc}$ is less than the summed $ABS_i$ values. If yes, then Condition 6 is satisfied, and step 250 sets and error condition indicating that such a worst case tolerance is impossible to achieve.

Under an RSS tolerance model, $$T_{wc} = \sqrt{\sum_{i=1}^{N} (t_{rwi}^2) + \sum_{i=1}^{n} (t_{fi}^2)},$$

such that $\sum_{i=1}^{N} (t_{rwi}^2) = T_{wc}^2 - \sum_{i=1}^{n} (t_{fi}^2)$ where $t_{rwi}$ is an individual RSS tolerance value of a specified part feature dimension. For such an RSS tolerance model, step 224b determines whether $$\sum_{i=1}^{N} (t_{rwi}^2) \geq \sum_{i=1}^{N} (TDR_i^2)$$

If yes, then Condition 1 is satisfied, and step 226 sets each RSS tolerance value $t_{rwi}$ to its associated $TDR_i$.

Under the RSS tolerance model, step 228b determines whether $$\sum_{i=1}^{N} (TDR_i^2) > \sum_{i=1}^{N} (t_{rwi}^2) > \sum_{i=1}^{N} (DDT_i^2)$$

If yes, then Condition 2 is satisfied, and step 252 calculates $P_R$. Then, step 254 sets each RSS tolerance value $t_{rwi}$ to $$t_{rwi} = DTT_i + P_R(TDR_i - DTT_i).$$

Similarly, step 234b determines whether $$\sum_{i=1}^{N} (t_{rwi}^2) = \sum_{i=1}^{N} (DTT_i^2)$$

If yes, then Condition 3 is satisfied, and step 236 sets each RSS tolerance value $t_{rwi}$ to its associated $DTT_i$.

Step 238b determines whether $$\sum_{i=1}^{N} (DDT_i^2) > \sum_{i=1}^{N} (t_{rwi}^2) > \sum_{i=1}^{N} (ABS_i^2)$$

If yes, then Condition 4 is satisfied, and step 256 calculates $P_S$. Then, step 258 sets each RSS tolerance value $t_{rwi}$ to $$t_{rwi} = ABS_i + P_R(DTT_i - ABS_i)$$

Step 244b determines whether $$\sum_{i=1}^{N} (t_{rwi}^2) = \sum_{i=1}^{N} (ABS_i^2)$$

If yes, then Condition 5 is satisfied, and step 246 sets each RSS tolerance value to its associated $ABS_i$.

Step 248b determines whether $$\sum_{i=1}^{N} (t_{rwi}^2) < \sum_{i=1}^{N} (ABS_i^2)$$

If yes, then Condition 6 is satisfied, and step 250 sets an error condition indicating that such a worst case tolerance is impossible to achieve.

Under an MRSS tolerance model, $$T_{wc} = Cf \times \sqrt{\sum_{i=1}^{N} (t_{mwi}^2) + \sum_{i=1}^{n} (t_{fi}^2)},$$

such that $\sum_{i=1}^{N} (t_{mwi}^2) = \dfrac{T_{wc}^2}{Cf^2} - \sum_{i=1}^{n} (t_{fi}^2)$ where $t_{mwi}$ is an individual MRSS tolerance value of a specified part feature dimension. For such an MRSS tolerance model, step 224c determines whether $$\sum_{i=1}^{N} (t_{mwi}^2) \geq \sum_{i=1}^{N} (TDR_i^2)$$

If yes, then Condition 1 is satisfied, and step 226 sets each MRSS tolerance value $t_{mwi}$ to its associated $TDR_i$.

Under the MRSS tolerance model, step 228c determines whether $$\sum_{i=1}^{N} (TDR_i^2) > \sum_{i=1}^{N} (t_{mwi}^2) > \sum_{i=1}^{N} (DDT_i^2)$$

If yes, then Condition 2 is satisfied, and step 264 calculates $P_{mw}$. Then, step 266 sets each MRSS tolerance value $t_{mwi}$ to $t_{mwi} = DTT_i + P_{mw}(TDR_i - DTT_i)$.

Similarly, step 234c determines whether $$\sum_{i=1}^{N} (t_{mwi}^2) = \sum_{i=1}^{N} (DTT_i^2)$$

If yes, then Condition 3 is satisfied, and step 236 sets each MRSS tolerance value $t_{mwi}$ to its associated $DTT_i$.

Step 238c determines whether $$\sum_{i=1}^{N} (DDT_i^2) > \sum_{i=1}^{N} (t_{mwi}^2) > \sum_{i=1}^{N} (ABS_i^2)$$

If yes, then Condition 4 is satisfied, and step 268 calculates $P_{mw}$. Then, step 270 sets each MRSS tolerance value $t_{mwi}$ to $t_{mwi} = ABS_i + P_{mw}(DTT_i - ABS_i)$ Step 244c determines whether $$\sum_{i=1}^{N} (t_{mwi}^2) = \sum_{i=1}^{N} (ABS_i^2)$$

If yes, then Condition 5 is satisfied, and step 246 sets each MRSS tolerance value to its associated $ABS_i$.

Step 248c determines whether $$\sum_{i=1}^{N} (t_{mwi}^2) < \sum_{i=1}^{N} (ABS_i^2)$$

If yes, then Condition 6 is satisfied, and step 250 sets an error condition indicating that such a worst case tolerance is impossible to achieve.

Finally, in FIG. 5a, Step 276 calculates the nominal size of the assembly stackup's relevant feature dimension, such as assembly gap 30 in FIG. 1, based upon nominal sizes specified at steps 200b and 200c. This value is provided to nominal size output field 278.

In steps 252 (Condition 2) and 256 (Condition 4), $P_R$ for the RSS tolerance model is calculated by recognizing that $$T_{wc}^2 = \sum_{i=1}^{N} (t_{rwi}^2) + \sum_{i=1}^{n} (t_{fi}^2)$$

as defined further hereinabove in connection with Table 1, where $T_{wc}$ is the total worst case tolerance specified at step 200e, and where $t_{fi}$ are the fixed tolerances specified at step 200d. Thus, $$\sum_{i=1}^{N} (t_{rwi}^2) = T_{wc}^2 - \sum_{i=1}^{n} (t_{fi}^2)$$

so that $$\sum_{i=1}^{N} (t_{rwi}^2)$$

is a known value.

Consequently, in step 252 (Condition 2), $P_R$ may be solved by substituting $t_{rwi} = DTT_i + P_R(TDR_i - DTT_i)$ into $$\sum_{i=1}^{N} (t_{rwi}^2).$$

In step 256 (Condition 4), $P_R$ may be solved by substituting $t_{rwi} = ABS_i + P_R(DTT_i - ABS_i)$ into $$\sum_{i=1}^{N} (t_{rwi}^2).$$

After substituting for $t_{rwi}$ in this manner, the only unknown variable is $P_R$, which may then be calculated using the solution to the quadratic equation $$P_R = \dfrac{-b + \sqrt{b^2 - 4ac}}{2a}$$

In step 252 (Condition 2), $$a = \sum_{i=1}^{N} (TDR_i - DTT_i)^2$$

-continued $$b = 2 \times \sum_{i=1}^{N} DTT_i(TDR_i - DTT_i)$$

$$c = \sum_{i=1}^{N} (DTT_i^2) - \sum_{i=1}^{N} (t_{rwi}^2)$$

In step 256 (Condition 4), $$a = \sum_{i=1}^{N} (DTT_i - ABS_i)^2$$

$$b = 2 \times \sum_{i=1}^{N} ABS_i(DDT_i - ABS_i)$$

$$c = \sum_{i=1}^{N} (ABS_i^2) - \sum_{i=1}^{N} (t_{rwi}^2)$$

After solving for $P_R$ in this manner, all $t_{rwi}$ may be calculated as described further hereinabove in connection with steps 254 (Condition 2) and 258 (Condition 4). If a calculated $t_{rwi}$ is greater than its associated $TDR_i$, then the $t_{rwi}$ should be set to its associated $TDR_i$.

In steps 264 (Condition 2) and 268 (Condition 4), $P_{mw}$ for the MRSS tolerance model is calculated by recognizing that $$T_{wc}^2 = C_f^2 \left[ \sum_{i=1}^{N} (t_{mwi}^2) + \sum_{i=1}^{n} (t_{fi}^2) \right]$$

as defined further hereinabove in connection with Table 1, where $T_{wc}$ is the total worst case tolerance specified at step 200e, and where $t_{fi}$ are the fixed tolerances specified at step 200d. Thus, $$\sum_{i=1}^{N} (t_{mwi}^2) = \frac{T_{wc}^2}{C_f^2} - \sum_{i=1}^{n} (t_{fi}^2)$$

Consequently, in step 264 (Condition 2), $P_{mw}$ may be solved by substituting $$t_{mwi} = DTT_i + P_{mw}(TDR_i - DTT_i)$$

into $$\sum_{i=1}^{N} (t_{mwi}^2).$$

In step 268 (Condition 4), $P_{mw}$ may be solved by substituting $$t_{mwi} = ABS_i + P_{mw}(DTT_i - ABS_i)$$

into $$\sum_{i=1}^{N} (t_{mwi}^2).$$

After substituting for $t_{mwi}$ in this manner, $P_{mw}$ may be calculated using the solution to the quadratic equation $$P_{mw} = \frac{-b + \sqrt{b^2 - 4ac}}{2a}$$

In step 264 (Condition 2), $$a = \sum_{i=1}^{N} (TDR_i - DTT_i)^2$$

$$b = 2 \times \sum_{i=1}^{N} DTT_i(TDR_i - DTT_i)$$

$$c = \sum_{i=1}^{N} (DTT_i^2) - \sum_{i=1}^{N} (t_{mwi}^2)$$

In step 268 (Condition 4), $$a = \sum_{i=1}^{N} (DTT_i - ABS_i)^2$$

$$b = 2 \times \sum_{i=1}^{N} ABS_i(DDT_i - ABS_i)$$

$$c = \sum_{i=1}^{N} (ABS_i^2) - \sum_{i=1}^{N} (t_{mwi}^2)$$

However, unlike the similar situation discussed above for the RSS tolerance model, $$\sum_{i=1}^{N} (t_{mwi}^2)$$

is initially an unknown value in the MRSS tolerance model, because $$C_f = 1 + \frac{0.5(T_{mr} - T_{rss})}{T_{rss}(\sqrt{n} - 1)},$$

where $$T_{mr} = \sum_{i=1}^{N} t_{mwi} + \sum_{i=1}^{n} t_{fi},$$

and where $$T_{rss} = \sqrt{\sum_{i=1}^{N} (t_{mwi}^2) + \sum_{i=1}^{n} (t_{fi}^2)}$$

Nevertheless, $$\sum_{i=1}^{N} (t_{mwi}^2)$$

and $P_{mw}$ may be easily solved by a converging process of two iterations. Accordingly, in the preferred embodiment, a first iteration initially estimates $C_f$ by calculating all $t_{rwi}$ using the RSS tolerance model. Thus in step 264 (Condition 2), all $t_{rwi}$ are calculated as described hereinabove in connection with step 252. In step 268 (Condition 4), all $t_{rwi}$ are calculated as described hereinabove in connection with step 256.

After all $t_{rwi}$ are calculated, $T_{mr}$ is initially estimated by setting $$T_{mr} = \sum_{i=1}^{N} t_{rwi} + \sum_{i=1}^{n} t_{fi}$$

and $T_{rss}$ is initially estimated by setting $$T_{rss} = \sqrt{\sum_{i=1}^{N} (t_{rwi}^2) + \sum_{i=1}^{n} (t_{fi}^2)}$$

Then, the following steps are performed.

Step 1. Using the estimates of $T_{mr}$ and $T_{rss}$, an estimate is calculated for $C_f$.

Step 2. Since $T_{wc} = T_{rss} \times C_f$, an estimate of $T_{rss}$ is calculated by dividing $T_{wc}$ (specified at step 200e of FIG. 5) by the estimate of $C_f$ calculated in Step 1.

Step 3. Since $$T_{rss}^2 = \sum_{i=1}^{N} (t_{mwi}^2) + \sum_{i=1}^{n} (t_{fi}^2),$$

the estimate of $T_{rss}$ from step 2 is used to estimate $$\sum_{i=1}^{N} (t_{mwi}^2)$$

according to $$\sum_{i=1}^{N} (t_{mwi}^2) = T_{rss}^2 - \sum_{i=1}^{n} (t_{fi}^2)$$

Step 4. In step 264 of FIG. 5, the estimate of $$\sum_{i=1}^{N} (t_{mwi}^2)$$

from Step 3 is used to confirm that Condition 2 is satisfied. Alternatively, in step 268 of FIG. 5, the estimate of $$\sum_{i=1}^{N} (t_{mwi}^2)$$

from Step 3 is used to confirm that Condition 4 is satisfied.

Step 5. The estimate of $$\sum_{i=1}^{N} (t_{mwi}^2)$$

from Step 3 is substituted into the quadratic equation expression for calculating $P_{mw}$.

Step 6. In step 264 (Condition 2) of FIG. 5, $P_{mw}$ from Step 5 is used to compute $$t_{mwi} = DTT_i + P_{mw}(TDR_i - DTT_i)$$

Alternatively, in step 268 (Condition 4) of FIG. 5, $P_{mw}$ from Step 5 is used to compute $$t_{mwi} = ABS_i + P_{mw}(DDT_i - ABS_i)$$

Then, a second iteration estimates $C_f$ by calculating new estimates for $T_{mr}$ and $T_{rss}$ according to $$T_{mr} = \sum_{i=1}^{N} t_{mwi} + \sum_{i=1}^{n} t_{fi}$$

and according to $$T_{rss} = \sqrt{\sum_{i=1}^{N} (t_{mwi}^2) + \sum_{i=1}^{n} (t_{fi}^2)}$$

based upon $t_{mwi}$ computed in Step 6.

In the preferred embodiment, Steps 1 through 5 are then repeated once in order to calculate a final value of $P_{mw}$.

Figure 6:
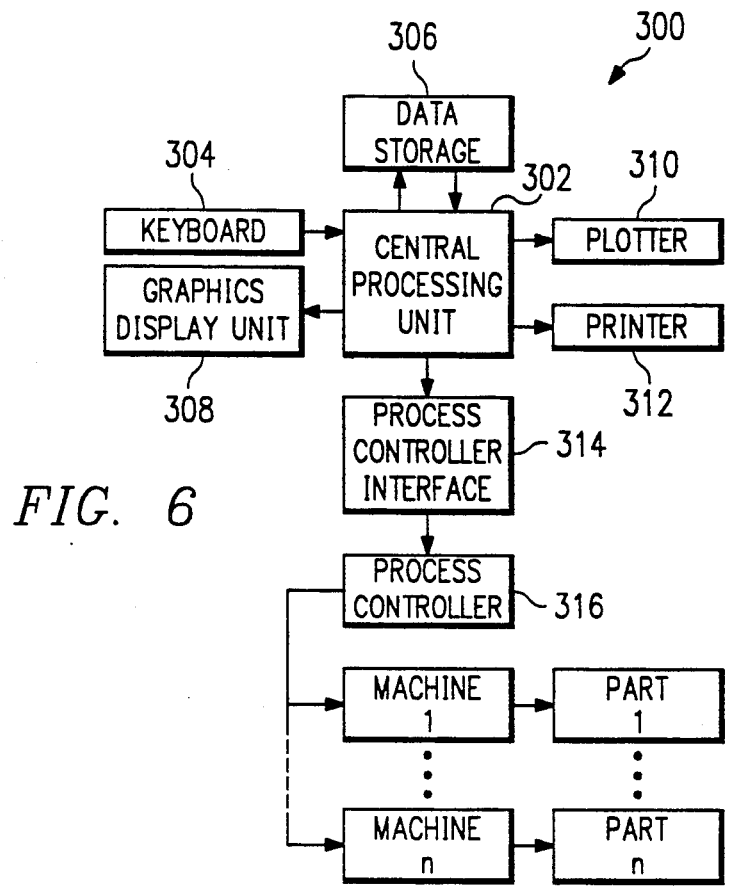
FIG. 6 is a schematic block diagram of a manufacturing system, according to the preferred embodiment.

FIG. 6 is a schematic block diagram of a manufacturing system, indicated generally at 300, according to the preferred embodiment. A central processing unit ("CPU") 302 receives user commands from a keyboard 304 and further receives data from a data storage device 306, such as a hard disk drive. CPU 302 computes worst case tolerances, RSS tolerances, and MRSS tolerances according to the approach described further hereinabove in connection with FIG. 5, based upon data stored by data storage device 306, and in response to user-specified commands and data input from keyboard 304. Then, CPU 302 outputs commands and data to a graphics display unit 308 for creating a graphics display output of the assembly stackup and for indicating computed tolerances of part features in the assembly stackup. CPU 302 also outputs commands and data to a plotter 310 for plotting a hardcopy drawing of the assembly stackup and for indicating computed tolerances of part features in the assembly stackup. Moreover, CPU outputs commands and data to a printer 312 for printing a hardcopy listing of computed tolerances of part features in the assembly stackup. CPU 302, keyboard 304, data storage device 306, and graphics display unit 308 together form a computer aided design ("CAD") system.

CPU 302 further outputs commands and data to a process controller interface 314. The data provided from CPU 302 to process controller interface 314 includes comprehensive descriptions of part features in the assembly stackup, interrelationships between the part features, nominal sizes of part features, and the computed tolerances of part features. Process controller interface 314 translates the commands and data from CPU 302 into a format recognizable by a process controller 316. Process controller 316 properly selects one or more of machines 1-n for manufacturing parts 1-n in accordance with the commands and data provided from CPU 302 to process controller interface 314. As an example, machines 1-n may include a turret lathe, an engine lathe, a horizontal mill such as a Nigata or a Matsura, or a vertical mill such as a jig bore.

In selecting one or more of machines 1-n, process controller 316 gives proper consideration to the computed tolerances of part features, thereby ensuring that a selected machine is technologically capable of manufacturing a part feature in accordance with the computed tolerances. If more than one of machines 1-n are technologically capable of manufacturing a certain part feature in accordance with the computed tolerance, then process controller 316 preferably selects the most cost-efficient machine available.

System 300 of FIG. 6 is also useful without process controller interface 314 and process controller 316. The graphics display output from graphics display unit 308, the hardcopy drawing from plotter 310, and the hardcopy listing from printer 312 can be used by a machine shop to implement the automated functions of process controller 316. In manufacturing a part feature, a machine shop can first select a process for manufacturing the part feature. Second, the machine shop selects a machine for performing the selected process in accordance with the computed tolerance. Third, the machine shop monitors the selected machine to ensure that the part feature is properly manufactured by the selected machine in accordance with the specified tolerance. Significantly, machine shops frequently use statistical process control to manufacture part features. Many machines use an automatic feedback loop to properly manufacture part features in a self-controlled manner, with minimum human supervision.

Figure 7:
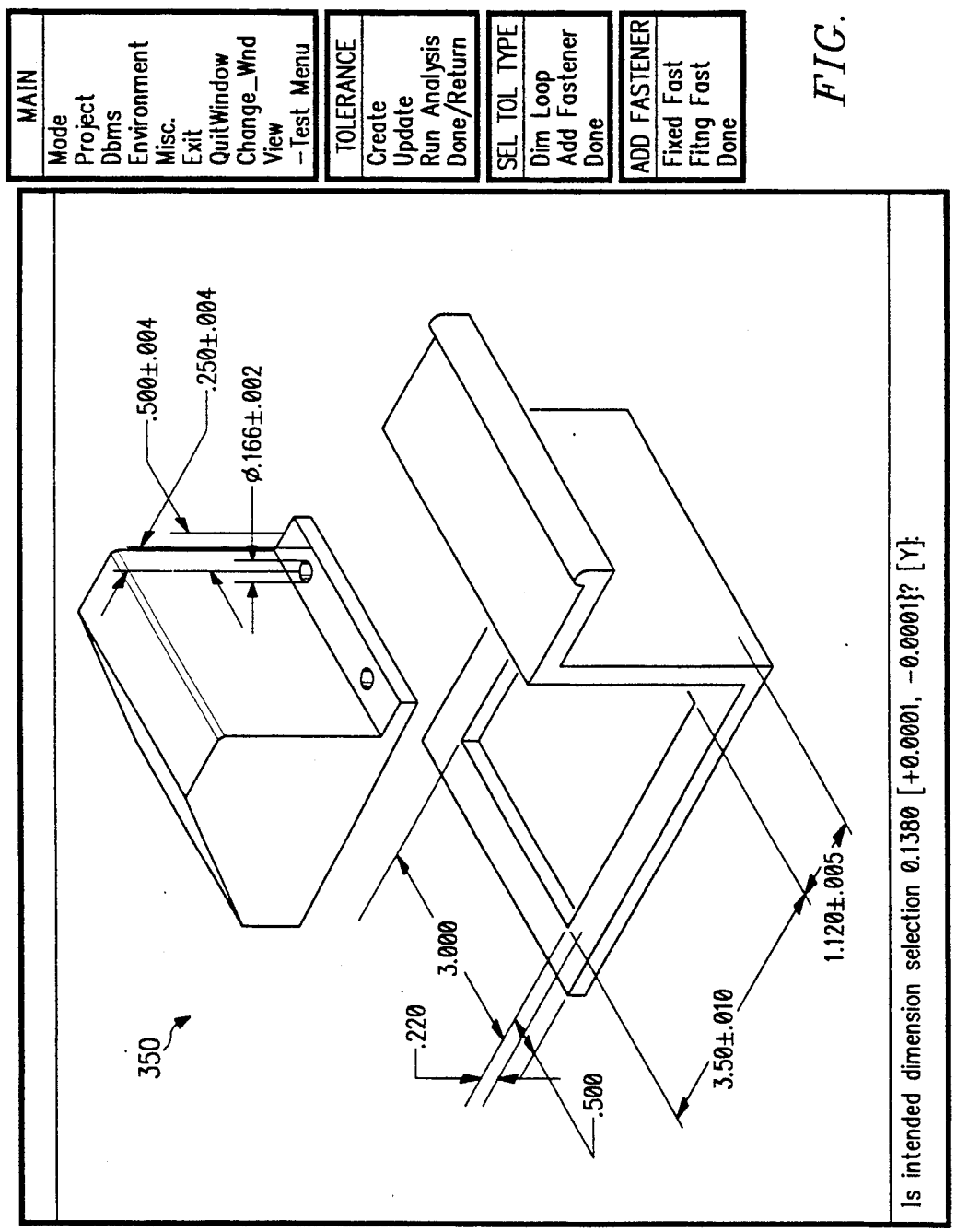
FIG. 7 is an exemplary graphics display output of the manufacturing system, according to the preferred embodiment.

FIG. 7 is an exemplary graphics display output, indicated generally at 350, of the manufacturing system, according to the preferred embodiment. Graphics display output 350 is produced by graphics display unit 308 of the CAD system formed by CPU 302, keyboard 304, data storage device 306, and graphics display unit 308 of FIG. 6. Graphics display output 350 provides a comprehensive visual picture of different parts of an assembly stackup, together with nominal sizes and computed tolerances of various part features. By displaying such a comprehensive visual picture of different parts together with the allocated tolerances of various part features computed according to the approach of the preferred embodiment, a user can easily modify elements of a design to simultaneously explore different combinations of functionality and manufacturability.

Figure 8:
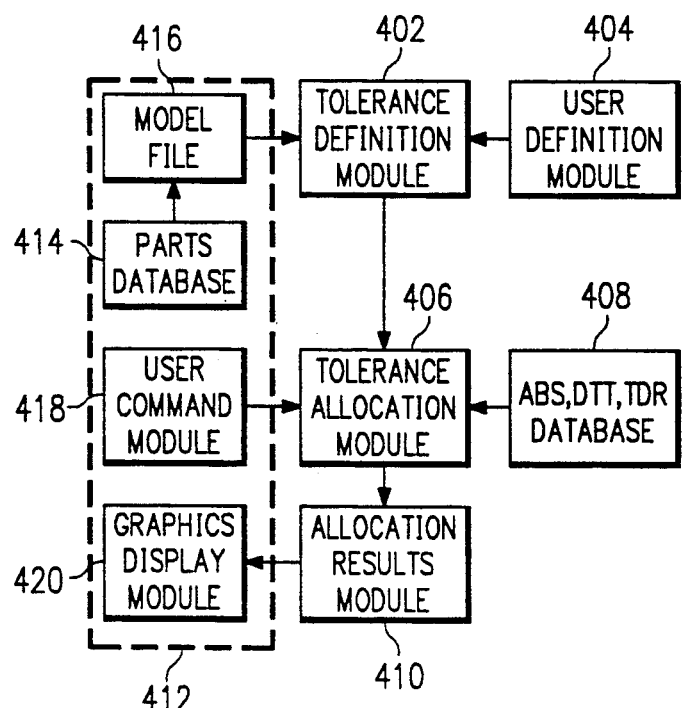
FIG. 8 is a data flow diagram showing an interface between software modules implementing the approach of the preferred embodiment and a commercially available computer aided design system.

FIG. 8 is a data flow diagram, indicated generally at 400, showing an interface between software modules 402, 404, 406, 408 and 410 implementing the approach of the preferred embodiment and a commercially available CAD system indicated by dashed enclosure 412. In the preferred embodiment, software modules 402, 404, 404, 406, 408 and 410 are interfaced to CAD system 412 to take advantage of basic capabilities of CAD system 412 relating to data storage, graphics display, and user command/data input. By interfacing to CAD system 412, tolerance definition module 402 inputs data from parts database 414 and model file 416 concerning physical descriptions, sizes, connections, and types of part features. By interfacing tolerance allocation module 406 to user command module 418, a user can initiate the tolerance allocation procedure of the preferred embodiment using a command menu of CAD system 412. Graphics display module 420 controls a graphics display unit of CAD system 412 for creating a graphics display output of the assembly stackup. By interfacing allocation results module 410 to graphics display module 420, allocation results module 410 outputs computed tolerances of part features in the assembly stackup for display by the graphics display unit as discussed further hereinabove in connection with FIG. 7.

User definition module 404 inputs commands and data from a user, so that the user can specify a dimension loop and equation for an assembly stackup as described further hereinabove in connection with FIG. 1 and Table 1. Tolerance definition module 402 inputs (1) the user-specified dimension loop and equation from user definition module 404 and (2) data from parts database 14 and model file 416 concerning physical descriptions, sizes, connections, and types of part features. Based upon such data, tolerance definition module 402 outputs data to tolerance allocation module 406 concerning relevant part features in accordance with steps 200a–e of FIG. 5a.

Tolerance allocation module 406 executes the tolerance allocation procedure described further herein-above in connection with FIGS. 5a–g, based upon data from tolerance definition module 402, and further based upon data from ABS/DTT/TDR database 408. Computed tolerances are output by tolerance allocation module 406 to allocation results module 410. Computed tolerances include nominal assembly tolerance, worst case tolerances, RSS tolerances, and MRSS tolerances.

In the preferred embodiment, CAD system 412 is a Pro/ENGINEER CAD system. Information concerning Pro/ENGINEER and its associated products is hereby fully incorporated by reference herein, as commercially available from PARAMETRIC TECHNOLOGY CORPORATION, 128 Technology Drive, Waltham, Mass. 02154, (617) 894-7111. The Pro/ENGINEER system includes a developer's tool kit which provides a means to expand the basic functionality of the CAD system by adding user-defined applications, such as the approach of the preferred embodiment.

In its basic form, Pro/ENGINEER is a dimension-driven, part feature based, solid modeling system for mechanical design. Pro/ENGINEER supports interactive design modifications to models of mechanical assemblies and part features. A parametric solid model is created by defining general part features and relationships that characterize an assembly stackup. The model can then be easily modified by changing any dimension or relationship, and Pro/ENGINEER automatically propagates the change throughout the model.

The Pro/ENGINEER database is a double precision, complete boundary representation solid model. This provides accurate calculations of mass properties for parts and assemblies, and interference checking between part features in assembly stackups. Tolerances are supported for every dimension of a model and can be used to regenerate a model to its maximum or minimum material conditions.

The part feature based, parametric construction technique allows Pro/ENGINEER to capture the design intent, thereby facilitating later design modifications. Pro/ENGINEER provides a set of common engineering part features, such as protrusions, slots, holes, chambers, and fillets. Pro/ENGINEER also provides the option to create a library of user-defined part features. These user-defined part features provide a consistent set of part features for all users. This can increase the productivity of users by eliminating the need to recreate standard part features, and it also enhances design control and enforces design standards. Thus, the approach of the preferred embodiment is advantageously interfaced to the Pro/ENGINEER system, thereby presenting a common interface to users.

As illustrated by FIG. 3b, which shows how a percentage cost of manufacturing a drilled hole increases to achieve a higher ratio of length versus diameter, the approach of the preferred embodiment can be applied to any design field with variable relationships analogous to manufacturing tolerances. One such area is electronic circuit design. An analogy exists between (1) the effect of part feature tolerances on the variation of a mechanical assembly gap and (2) the effect of performance tolerances for electronic components on the resulting output of an electronic circuit. Several CAD systems are commercially available for performing electronic circuit tolerance analysis, but appropriate assignment of electronic component performance tolerances is achieved in an iterative manner. Application of the approach of the preferred embodiment would greatly simplify and enhance the assignment of such electronic component performance tolerances.

Although the present invention and its advantages have been described in detail, it should be understood that various changes, substitutions and alterations can be made herein without departing from the spirit and scope of the invention as defined by the appended claims.

What is claimed is:

1. A computer aided design apparatus for allocating tolerances, comprising:
    specification circuitry for specifying a total tolerance to be allocated among a plurality of variable tolerances each having an associated assembly feature;
    first definition circuitry for defining, for each said associated assembly feature, an associated first tolerance point at which a further decrease in a stringency of one of said variable tolerances fails to significantly decrease a cost of achieving said one of said variable tolerances;
    second definition circuitry for defining, for each said associated assembly feature, an associated second tolerance point at which a further increase in said stringency begins to substantially increase the cost of achieving said one of said variable tolerances;
    third definition circuitry for defining, for each said associated assembly feature, an associated third tolerance point at which a further increase in said stringency is not substantially achievable; and
    allocation circuitry coupled to said specification circuitry and to a plurality of said first definition circuitry, said second definition circuitry and said third definition circuitry, for allocating said total tolerance among said variable tolerances, such that said variable tolerances substantially satisfy a first predetermined relationship relative to said total tolerance, and such that each said one of said variable tolerances substantially satisfies a second predetermined relationship relative to its associated tolerance points.

2. The apparatus of claim 1 wherein each said associated first tolerance point forms an associated tolerance of diminishing returns.

3. The apparatus of claim 1 wherein each said associated second tolerance point forms an associated difficulty threshold tolerance.

4. The apparatus of claim 1 wherein each said associated third tolerance point forms an associated absolute tolerance.

5. The apparatus of claim 1 wherein said first predetermined relationship is a worst case tolerance relationship, such that said total tolerance approximately equals a sum of said variable tolerances.

6. The apparatus of claim 1 wherein said first predetermined relationship is an RSS tolerance relationship, such that said total tolerance squared approximately equals a sum of squares of said variable tolerances.

7. The apparatus of claim 1 wherein said first predetermined relationship is an MRSS tolerance relationship, such that said total tolerance squared approximately equals a correction factor squared multiplied by a sum of squares of said variable tolerances.

8. The apparatus of claim 7 wherein said total tolerance includes a total fixed tolerance, and wherein said total tolerance is to be further allocated among at least one fixed tolerance, such that said total tolerance squared approximately equals said correction factor squared multiplied by a total of said sum of squares of said variable tolerances and a sum of squares of each said fixed tolerance.

9. The apparatus of claim 1 wherein said second predetermined relationship is a linear proportionality constant relationship, such that a difference between each said one of said variable tolerances and its associated tolerance points is proportionally the same for each said one of said variable tolerances.

10. A computer aided design system for manufacturing assembly features, comprising:
    specification circuitry for specifying a total tolerance to be allocated among a plurality of variable tolerances each having an associated assembly feature;
    first definition circuitry for defining, for each said associated assembly feature, an associated first tolerance point at which a further decrease in a stringency of one of said variable tolerances fails to significantly decrease a cost of achieving said one of said variable tolerances;
    second definition circuitry for defining, for each said associated assembly feature, an associated second tolerance point at which a further increase in said stringency begins to substantially increase the cost of achieving said one of said variable tolerances;
    third definition circuitry for defining, for each said associated assembly feature, an associated third tolerance point at which a further increase in said stringency is not substantially achievable; and
    allocation circuitry coupled to said specification circuitry and to a plurality of said first definition circuitry, second definition circuitry and third definition circuitry, for allocating said total tolerance among said variable tolerances, such that said variable tolerances substantially satisfy a first predetermined relationship relative to said total tolerance, and such that each said variable tolerance substantially satisfies a second predetermined relationship relative to its associated tolerance points.

11. The system of claim 10 and further comprising a manufacturing process for manufacturing at least one of said associated assembly feature in response to at least one of said variable tolerances allocated by said allocation circuitry.

12. The system of claim 10 and further comprising:
    control circuitry coupled to said allocation circuitry for outputting at least one control signal in response to at least one of said variable tolerances allocated by said allocation circuitry; and
    a plurality of manufacturing devices each coupled to said control circuitry and operable to manufacture at least one said associated assembly feature in response to being selected by said control signal from said control circuitry.

13. System for computer aided design, comprising:
    modelling circuitry for modelling a plurality of features;
    specification circuitry for specifying a total tolerance to be allocated among a plurality of variable tolerances each having an associated one of said assembly features;
    first definition circuitry for defining, for each said associated assembly feature, an associated first tolerance point at which a further decrease in a stringency of one of said variable tolerances fails to significantly decrease a cost of achieving said variable tolerance;
    second definition circuitry for defining, for each said associated assembly feature, an associated second tolerance point at which a further increase in said stringency begins to substantially increase the cost of achieving said variable tolerance;

third definition circuitry for defining, for each said associated assembly feature, an associated third tolerance point at which a further increase in said stringency is not substantially achievable;

allocation circuitry coupled to said specification circuitry and to a plurality of said first definition circuitry, second definition circuitry and said third definition circuitry for allocating said total tolerance among said variable tolerances, such that said variable tolerances substantially satisfy a first predetermined relationship relative to said total tolerance, and such that each said one of said variable tolerances substantially satisfies a second predetermined relationship relative to its associated tolerance points; and display circuitry coupled to said modelling circuitry and to said allocation circuitry for displaying at least one of said variable tolerances and its associated assembly feature.

14. A method of allocating tolerances, comprising the steps of:

specifying a total tolerance to be allocated among a plurality of variable tolerances each having an associated assembly feature;

for each said associated assembly feature, defining an associated first tolerance point at which a further decrease in a stringency of said variable tolerance fails to significantly decrease a cost of achieving one of said variable tolerances;

for each said associated assembly feature, defining an associated second tolerance point at which a further increase in said stringency begins to substantially increase the cost of achieving said one of said variable tolerances;

for each said associated assembly feature, defining an associated third tolerance point at which a further increase in said stringency is not substantially achievable; and allocating said total tolerance among said variable tolerances such that said variable tolerances substantially satisfy a first predetermined relationship relative to said total tolerance and such that each said one of said variable tolerances substantially satisfies a second predetermined relationship relative to its associated tolerance points.

15. The method of claim 14 and further comprising the step of manufacturing said associated assembly feature in response to at least one of said variable tolerances allocated by said allocation circuitry.

16. The method of claim 14 and further comprising the steps of:

outputting at least one control signal in response to at least one of said variable tolerances allocated by said allocation circuitry, wherein each said control signal selects one of a plurality of manufacturing devices; and using each selected manufacturing device of said manufacturing devices to manufacture at least one of said associated assembly features in response to said control signal from said control circuitry.

17. A method for allocating tolerances in the manufacture of a part, comprising the steps of:

retrieving a total tolerance for allocation;

for each of a plurality of part features, retrieving, from a database, an associated absolute tolerance (ABS) value, an associated difficulty threshold tolerance (DTT) value, and an associated tolerance of diminishing returns (TDR) value;

for each part feature, adjusting its associated ABS, DTT and TDR values in response to a size of the part feature;

for each part feature, defining a worst case (WC) tolerance value $t_w$;

determining a sum of the $t_w$ values for all part features in response to said total tolerance;

summing the associated DTT values for all part features;

summing the associated ABS values for all part features;

summing the associated TDR values for all part features;

determining the relative magnitudes of the sum of the associated DTT values, the sum of the associated ABS values, the sum of the associated TDR values, and the determined sum of the $t_w$ values, all relative to each other;

if the sum of the $t_w$ values is greater than or equal to the sum of the TDR values, for each part feature, setting the $t_w$ value to its associated TDR value;

if the sum of the $t_w$ values is less than the sum of the TDR values but greater than the sum of the DTT values, for each part feature, allocating the $t_w$ value as a function of its associated DTT and TDR values and of said total tolerance;

if the sum of the $t_w$ values is equal to the sum of the DTT values, for each part feature, setting the $t_w$ value to its associated DTT value;

if the sum of the $t_w$ values is less than the sum of the DTT values but greater than the sum of the ABS values, for each part feature, allocating the $t_w$ value as a function of its associated DTT and ABS values and of said total tolerance;

if the sum of the $t_w$ values is equal to the sum of the ABS values, for each part feature, setting the $t_w$ value to its associated ABS value; and if the sum of the $t_w$ values is less than the sum of the ABS values, generating an error signal.

18. A method for allocating tolerances in the manufacture of a part, comprising the steps of:

retrieving a total tolerance for allocation;

for each of a plurality of part features, retrieving, from a database, an associated absolute tolerance (ABS) value, an associated difficulty threshold tolerance (DTT) value, and an associated tolerance of diminishing returns (TDR) value;

for each part feature, adjusting its associated ABS, DTT and TDR values in response to a size of the part feature;

for each part feature, defining a root sum square (RSS) tolerance value $t_{rw}$;

determining a sum of the squares of the $t_{rw}$ values for all part features in response to said total tolerance squared;

summing the squares of the associated DTT values for all part features;

summing the squares of the associated ABS values for all part features;

summing the squares of the associated TDR values for all part features;

determining the relative magnitudes of the sum of the associated DTT squares, the sum of the associated ABS squares, the sum of the associated TDR squares, and the determined sum of the $t_{rw}$ squares, all relative to each other;

if the sum of the $t_{rw}$ squares is greater than or equal the sum of the TDR squares, for each part feature, setting the $t_{rw}$ value to its associated TDR value;

if the sum of the $t_{rw}$ squares is less than the sum of the TDR squares but greater than the sum of the DTT squares, for each part feature, allocating the $t_{rw}$ value as a function of its associated DTT and TDR values and of said total tolerance squared;

if the sum of the $t_{rw}$ squares is equal to the sum of the DTT squares, for each part feature, setting the $t_{rw}$ value to its associated DTT value;

if the sum of the $t_{rw}$ squares is less than the sum of the DTT squares but greater than the sum of the ABS squares, for each part feature, allocating the $t_{rw}$ value as a function of its associated DTT and ABS values and of said total tolerance squared;

if the sum of the $t_{rw}$ squares is equal to the sum of the ABS squares, for each part feature, setting the $t_{rw}$ value to its associated ABS value; and if the sum of the $t_{rw}$ squares is less than the sum of the ABS squares, generating an error signal.

19. The method of claim 18 wherein each said step of allocating the $t_{rw}$ value comprises the step of allocating the $t_{rw}$ value using the solution to the quadratic equation in response to said determined sum of squares of the $t_{rw}$ values.

20. A method for allocating tolerances in the manufacture of a part, comprising the steps of:

retrieving a total tolerance for allocation;

for each of a plurality of part features, retrieving, from a database, an associated absolute tolerance (ABS) value, an associated difficulty threshold tolerance (DTT) value, and an associated tolerance of diminishing returns (TDR) value;

for each part feature, adjusting its associated ABS, DTT and TDR values in response to a size of the part feature;

for each part feature, defining a modified root sum square (MRSS) tolerance value $t_{mw}$;

estimating a sum of the squares of the $t_{mw}$ values for all part features in response to said total tolerance squared;

summing the squares of the associated DTT values for all part features;

summing the squares of the associated ABS values for all part features;

summing the squares of the associated TDR values for all part features;

determining the relative magnitudes of the sum of the associated DTT squares, the sum of the associated ABS squares, the sum of the associated TDR squares, and the estimated sum of the $t_{mw}$ squares, all relative to each other;

if the sum of the $t_{mw}$ squares is greater than or equal to the sum of the TDR squares, for each part feature, setting the $t_{mw}$ value to its associated TDR value;

if the sum of the $t_{mw}$ squares is less than the sum of the TDR squares but greater than the sum of the DTT squares, for each part feature, allocating the $t_{mw}$ value as a function of its associated DTT and TDR values and of said total tolerance squared;

if the sum of the $t_{mw}$ squares is equal to the sum of the DTT squares, for each part feature, setting the $t_{mw}$ value to its associated DTT value;

if the sum of the $t_{mw}$ squares is less than the sum of the DTT squares but greater than the sum of the ABS squares, for each part feature, allocating the $t_{mw}$ value as a function of its associated DTT and ABS values and of said total tolerance squared;

if the sum of the $t_{mw}$ squares is equal to the sum of the ABS squares, for each part feature, setting the $t_{mw}$ value to its associated ABS value; and if the sum of the $t_{mw}$ squares is less than the sum of the ABS squares, generating an error signal.

21. The method of claim 20 wherein each said step of allocating the $t_{mw}$ value comprises the step of allocating the $t_{mw}$ value using the solution to the quadratic equation in response to an estimated sum of squares of the $t_{mw}$ values.

22. The method of claim 21 wherein said estimating step comprises the steps of:

for each part feature, defining a root sum square (RSS) tolerance value $t_{rw}$;

determining a sum of the squares of the $t_{rw}$ values for all part features in response to said total tolerance squared;

allocating said $t_{rw}$ values in response to retrieved values from said database and to said total tolerance;

estimating a correction factor in response to said $t_{rw}$ values;

estimating said sum of the squares of the $t_{mw}$ values for all part features in response to said total tolerance squared and said correction factor squared; and allocating each $t_{mw}$ value using the solution to the quadratic equation in response to an estimated sum of the squares of the $t_{mw}$ values.

23. The method of claim 22 and further comprising the step of estimating said correction factor in response to allocated $t_{mw}$ values.

* * * * *